US012626651B2

(12) United States Patent
Kim et al.

(10) Patent No.: US 12,626,651 B2
(45) Date of Patent: May 12, 2026

(54) DISPLAY DEVICE AND ELECTRONIC DEVICE

(71) Applicant: Samsung Display Co., Ltd., Yongin-Si (KR)

(72) Inventors: Soo Yeon Kim, Yongin-si (KR); Min Woo Kim, Yongin-si (KR); Chong Guk Lee, Yongin-si (KR); Yong Sik Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/991,713

(22) Filed: Dec. 23, 2024

(65) Prior Publication Data

US 2026/0004711 A1 Jan. 1, 2026

(30) Foreign Application Priority Data

Jul. 1, 2024 (KR) ........................ 10-2024-0086313

(51) Int. Cl.
*G09G 3/20* (2006.01)
*G09G 3/32* (2016.01)
*G09G 3/3275* (2016.01)

(52) U.S. Cl.
CPC ............. *G09G 3/32* (2013.01); *G09G 3/3275* (2013.01); *G09G 2310/0275* (2013.01); *G09G 2310/08* (2013.01); *G09G 2320/0257* (2013.01); *G09G 2330/021* (2013.01); *G09G 2330/06* (2013.01)

(58) Field of Classification Search
CPC ................... G09G 3/32; G09G 3/3275; G09G 2310/0275; G09G 2310/08; G09G 2320/0257; G09G 2330/021; G09G 2330/06
USPC ........................................................... 345/55
See application file for complete search history.

(56) References Cited

U.S. PATENT DOCUMENTS

2009/0174691 A1* 7/2009 Yeo ........................ G09G 5/008 345/204
2014/0043305 A1* 2/2014 Kim ........................ G09G 3/20 345/204
2017/0287429 A1* 10/2017 Kong ................... G09G 3/3607
2024/0282245 A1 8/2024 Kim et al.
2024/0339066 A1* 10/2024 Li .......................... G09G 5/006

FOREIGN PATENT DOCUMENTS

KR 10-2024-0128173 A 8/2024

OTHER PUBLICATIONS

Wikipedia, "GPIO (General-Purpose Input/Output)", last edited on May 7, 2024, 7 pages. URL: https://ko.wikipedia.org/wiki/GPIO. URL: https://ko.wikipedia.org/wiki/GPIO_English translation.

* cited by examiner

*Primary Examiner* — Jennifer T Nguyen
(74) *Attorney, Agent, or Firm* — Innovation Counsel LLP

(57) ABSTRACT

A display panel of a display device includes pixels connected to data lines, a timing controller generating image data, a data driver generating data signals based on the image data and outputting the data signals through an output terminal of the data driver, and a data distributor selectively connecting the output terminal of the data driver to the data lines of the display panel based on an enable control signal. The timing controller may periodically vary a data rate based on which the image data is transmitted to the data driver and may periodically vary an output time point of the enable control signal based on the data rate.

17 Claims, 16 Drawing Sheets

FIG. 12

| Data Rate | Frame Protocol Value | | | | |
|---|---|---|---|---|---|
| | 60 T | 66 T | 72 T | ··· | 198 T |
| 2.2 Gbps | 164 ns | 180 ns | 196 ns | ··· | 540 ns |
| 2.3 Gbps | 157 ns | 172 ns | 188 ns | ··· | 517 ns |
| 2.4 Gbps | 150 ns | 165 ns | 180 ns | ··· | 495 ns |
| 2.5 Gbps | 144 ns | 158 ns | 173 ns | ··· | 475 ns |
| 2.6 Gbps | 138 ns | 152 ns | 166 ns | ··· | 457 ns |
| 2.7 Gbps | 133 ns | 147 ns | 160 ns | ··· | 440 ns |
| 2.8 Gbps | 129 ns | 141 ns | 154 ns | ··· | 424 ns |
| 2.9 Gbps | 124 ns | 137 ns | 149 ns | ··· | 410 ns |
| 3.0 Gbps | 120 ns | 132 ns | 144 ns | ··· | 396 ns |

DISPLAY DEVICE AND ELECTRONIC DEVICE

CROSS-REFERENCE TO RELATED APPLICATION

This application claims priority to and the benefit of Korean Patent Application No. 10-2024-0086313 filed in the Korean Intellectual Property Office on Jul. 1, 2024, the entire contents of which are incorporated herein by reference.

BACKGROUND

1. Field

An embodiment of the present disclosure relates to a display device and an electronic device.

2. Description of the Related Art

With the advancement of technology, the amount of data that various electronic devices must process has rapidly increased, and as a result, the operation speed of these electronic devices is accelerated.

In order to process data at high speed, electronic devices typically generate high-frequency clock signals and perform specified operations based on the generated clock signals. However, the regularly generated high-frequency clock signals cause electromagnetic interference (hereinafter referred to as "EMI").

In order to reduce such EMI, a spread spectrum clock generation method is used, which decreases the power density of each frequency of the output signal. A spread spectrum clock generator (SSCG) may reduce EMI by spreading the spectrum of the output signal frequency.

SUMMARY OF THE INVENTION

The present disclosure is to provide a display device and an electronic device that may improve display quality.

Features of the present disclosure are not limited to the features mentioned above, and other technical features that are not mentioned may be clearly understood to a person of an ordinary skill in the art using the following description.

According to an embodiment of the present disclosure, a display device includes a display panel including pixels connected to data lines, a timing controller generating image data, a data driver that generates data signals based on the image data and outputs the data signals through an output terminal of the data driver, and a data distributor selectively connecting the output terminal of the data driver to the data lines of the display panel based on an enable control signal. The timing controller may periodically vary a data rate based on which the image data is transmitted to the data driver and may periodically vary an output time of the enable control signal based on the data rate.

The timing controller may include a spread spectrum clock generator that generates a clock signal, the data rate may correspond to a frequency of the clock signal, and the data driver outputs the data signals at a time point set based on the clock signal.

The timing controller may output the enable control signal while each data signal is output from the data driver.

The output time of the enable control signal may be varied in proportion to the data rate.

A period of the enable control signal may vary inversely proportional to the data rate.

The data distributor may include a transistor connecting the output terminal of the data driver to one of the data lines, the transistor may be turned on in response to the enable control signal having a first level and may be turned off in response to the enable control signal having a second level, and a pulse width of the enable control signal having the first level may not change, and a time period during which the enable control signal has the second level may vary based on the data rate.

The timing controller may generate the enable control signal based on an internal clock signal, and may compensate for the enable control signal based on the data rate.

The timing controller may compensate a period of the enable control signal in proportion to a data rate difference and a frame protocol value, the frame protocol value may be a set value for a horizontal period that is a time unit in which a data signal is output from the data driver, and may be included in a protocol between the timing controller and the data driver, and the data rate difference may be a difference between a data rate of a previous frame and a data rate of a current frame.

The timing controller may compensate for a period of the enable control signal using a lookup table, and the lookup table may include a compensation value according to the data rate.

The data rate may vary stepwise within a range of about ±15% with respect to a reference data rate.

The timing controller may vary the data rate and the output time of the enable control signal at least once every frame.

The timing controller may vary the data rate and the output time of the enable control signal for each frame.

The timing controller may increase the data rate stepwise from a minimum data rate to a maximum data rate or may decrease the data rate stepwise from the maximum data rate to the minimum data rate, over a certain period of time.

A refresh rate of the display panel may not be variable.

The timing controller and the data driver may be connected to each other through a first interface including at least one of a mobile industry processor interface (MIPI) or an Ultra path interconnect (UPI), and the timing controller may provide the enable control signal to the data distributor through a general purpose input/output (GPIO) different from the first interface.

According to an embodiment of the present disclosure, an electronic device includes a display panel, a data driver, a demultiplexer connected between the data driver and the display panel, and a processor that provides data to the data driver through a first interface and controls an operation of the demultiplexer by providing a control signal. The processor may adjust an output time of the control signal based on a data rate based on which the data is transmitted to the data driver.

The first interface may include at least one of a mobile industry processor interface (MIPI) or a ultra path interconnect (UPI), and the processor may output the control signal through a general purpose input/output (GPIO).

The output time of the control signal may be varied in proportion to the data rate.

As the data rate increases, an output time of a data signal output from the data driver to the demultiplexer may become earlier, and the processor may adjust the output time of the control signal to match the output time of the data signal.

The processor may generate the control signal based on an internal clock signal, and may compensate for the control signal based on the data rate.

The display device and the electronic device according to the embodiments of the present disclosure may reduce electromagnetic interference by periodically varying the data rate between the timing controller and the data driver. In addition, the display device and the electronic device may compensate for the output time (or period) of the enable control signal (that is, a signal for controlling the data distributor between the data driver and the display panel) based on the data rate. Accordingly, even if the time point at which the data signal is output from the data driver is varied by the data rate, the enable control signal may be output to match the output time (or period) of the data signal, and the deterioration of the display quality due to the mismatch between the data signal and the enable control signal may be prevented.

Effects of embodiments of the present disclosure are not limited by what is explained or illustrated above, and more various effects and features of the present disclosure will be described in detail in the following.

BRIEF DESCRIPTION OF THE DRAWINGS

FIG. 12 illustrates a horizontal period according to a data rate.

DETAILED DESCRIPTION OF THE EMBODIMENTS

Since the present disclosure may be modified in various ways and have multiple forms, particular embodiments will be illustrated and described in detail in the following. However, this is not intended to limit the present disclosure to any particular disclosed forms, and it is to be understood to include all modifications, equivalents, and alternatives that fall within the spirit and scope of the present disclosure.

Terms such as first, second, and the like will be used only to describe various elements, and are not to be interpreted as limiting these elements. These terms are only used to differentiate one element from another. For example, a first element may be referred to as a second element, and similarly, a second element may be referred to as a first element, without departing from the scope of the present disclosure. Singular forms are intended to include plural forms unless the context clearly indicates otherwise.

In the present disclosure, it should be understood that the term “include”, “comprise”, “have”, or “configure” indicates that a feature, a number, a step, an operation, an element, a part, or a combination thereof described in the specification is present, but does not exclude a possibility of presence or addition of one or more other features, numbers, steps, operations, elements, parts, or combinations, in advance.

Some embodiments are described in the accompanying drawings in relation to functional blocks, units, and/or modules. Those skilled in the art will understand that these blocks, units, and/or modules are physically implemented by logic circuits, discrete components, microprocessors, hard-wired circuits, memory elements, wire connections, and/or other electronic circuits. These may be formed by using semiconductor-based manufacturing techniques or other manufacturing techniques. In the case of the blocks, units, and/or modules being implemented by microprocessors or other similar hardware, they may be programmed and controlled by using software to perform various functions discussed herein and may optionally be driven by firmware and/or software. It is also contemplated that each block, unit, and/or module may be implemented by dedicated hardware, or as a combination of dedicated hardware to perform some functions and a processor (for example, one or more programmed microprocessors and associated circuitry) to perform other functions. In addition, each block, unit, and/or module of some embodiments may be physically separated into two or more interacting and discrete blocks, units, and/or modules without departing from the inventive concepts. Further, the blocks, units, and/or modules of some embodiments may be physically combined into more complex blocks, units, and/or modules without departing from the inventive concepts.

Hereinafter, a display device according to an embodiment of the present disclosure will be described with reference to drawings related to embodiments of the present disclosure.

Figure 1:
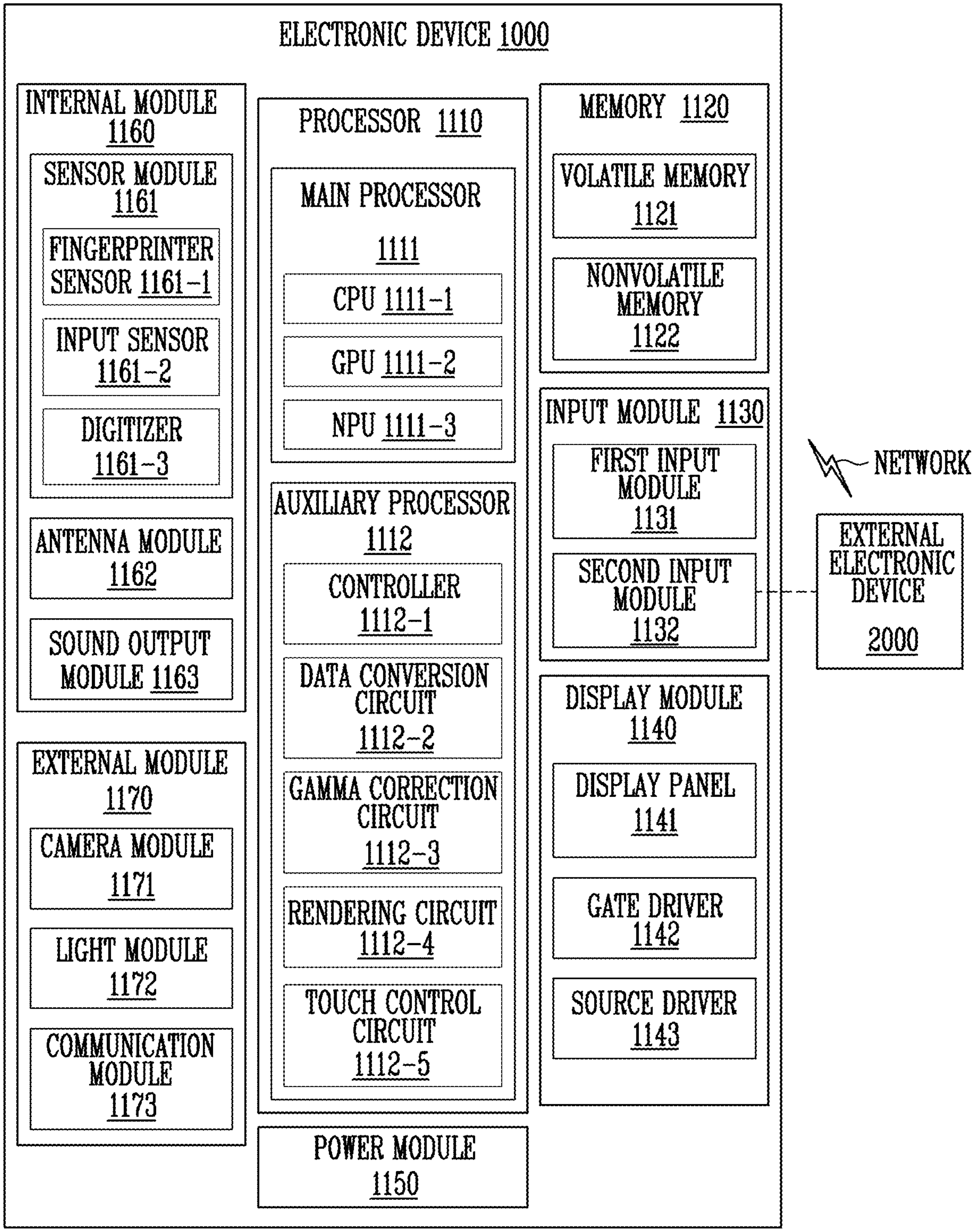
FIG. 1 illustrates an electronic device according to an embodiment.

FIG. 1 illustrates an electronic device according to an embodiment.

Referring to FIG. 1, an electronic device 1000 outputs various information through a display module 1140. The display module 1140 may correspond to at least a portion of the display device shown in FIG. 5. When a processor 1110 executes an application stored in a memory 1120, the display module 1140 provides application information to a user through a display panel 1141.

The processor 1110 receives external input through an input module 1130 or a sensor module 1161 and executes an application corresponding to the external input. For example, when the user selects a camera icon displayed on the display panel 1141, the processor 1110 receives user input through an input sensor 1161-2 and activates the camera module 1171. The processor 1110 transmits image data corresponding to a captured image obtained through the camera module 1171 to the display module 1140. The display module 1140 may display an image corresponding to the captured image through the display panel 1141.

As another example, when personal information authentication is performed in the display module 1140, a fingerprint sensor 1161-1 obtains inputted fingerprint information as input data. The processor 1110 compares the input data obtained through the fingerprint sensor 1161-1 with authentication data stored in the memory 1120, and executes an application according to the compared result. The display module 1140 may display information executed according to application logic through the display panel 1141.

As another example, when a user selects a music streaming icon displayed on the display module 1140, the processor 1110 obtains the user input through the input sensor 1161-2 and activates a music streaming application stored in the memory 1120. When a music execution instruction is input from the music streaming application, the processor 1110 activates a sound output module 1163 to provide sound information corresponding to the music execution instruction to the user.

In the above, the operation of the electronic device 1000 has been briefly described. Hereinafter, a configuration of the electronic device 1000 will be described in detail. Some of components of the electronic device 1000 to be described later may be integrated and provided as one component, and one component thereof may be divided and provided as two or more components.

The electronic device 1000 may communicate with an external electronic device 2000 through a network (for example, a short range wireless communication network or a long range wireless communication network). According to an embodiment, the electronic device 1000 may include the processor 1110, the memory 1120, an input module 1130, the display module 1140, a power module 1150, an internal module 1160, and an external module 1170. According to an embodiment, in the electronic device 1000, at least one of the aforementioned elements may be omitted, or one or more other elements may be added. According to an embodiment, some (for example, the sensor module 1161, an antenna module 1162, or a sound output module 1163) of the aforementioned elements may be integrated into another element (for example, the display module 1140).

The processor 1110 may execute software to control at least one other element (for example, a hardware or software element) of the electronic device 1000 connected to the processor 1110, and may perform various data processing or computational tasks. According to an embodiment, as part of the data processing or computation, the processor 1110 may store an instruction or data received from other element (for example, the input module 1130, the sensor module 1161, or a communication module 1173) in a volatile memory 1121, may process the instructions or data stored in the volatile memory 1121, and may store the resulting data in a non-volatile memory 1122.

The processor 1110 may include a main processor 1111 and an auxiliary processor 1112. The main processor 1111 may include one or more of a central processing unit (CPU) 1111-1 and an application processor (AP). The main processor 1111 may further include one or more of a graphic processing unit (GPU) 1111-2, a communication processor (CP), and an image signal processor (ISP). The main processor 1111 may further include a neural processing unit (NPU) 1111-3. The neural processing unit 1111-3 is a processor specialized in processing an artificial intelligence model, and the artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, and a combination of two or more thereof, but is not limited to the above example. The artificial intelligence models may additionally or alternatively include a software structure in addition to the hardware structure thereof. At least two of the aforementioned processing unit and processor may be implemented as an integrated component (for example, a single chip), or each thereof may be implemented as an independent component (for example, a plurality of chips).

The auxiliary processor 1112 may include a controller 1112-1. The controller 1112-1 may include an interface conversion circuit and a timing control circuit. The controller 1112-1 receives an image signal from the main processor 1111, converts a data format of the image signal to match an interface specification of the display module 1140, and outputs image data. The controller 1112-1 may output various control signals necessary for driving the display module 1140.

The auxiliary processor 1112 may further include a data conversion circuit 1112-2, a gamma correction circuit 1112-3, a rendering circuit 1112-4, and a touch control circuit 1112-5. The data conversion circuit 1112-2 may receive image data from the controller 1112-1, and it may compensate the image data in order for the display module 1140 to display the image with a desired luminance based on characteristics of the electronic device 1000 or a user's setting. In addition, it may convert the image data to reduce power consumption or compensate for an afterimage. In an embodiment, the controller 1112-1 and the data conversion circuit 1112-2 may have a configuration corresponding to at least a portion of the timing controller 140 shown in FIG. 5.

The gamma correction circuit 1112-3 may convert the image data or gamma reference voltage so that the image displayed on the electronic device 1000 has a desired gamma characteristic. The rendering circuit 1112-4 may receive image data from the controller 1112-1 and render the image data in consideration of pixel arrangement of the display panel 1141 applied to the electronic device 1000.

The touch control circuit 1112-5 may supply a touch driving signal to the input sensor 1161-2, and may receive a sensing signal from the input sensor 1161-2 in response to the touch driving signal.

At least one of the data conversion circuit 1112-2, the gamma correction circuit 1112-3, the rendering circuit 1112-4, or the touch control circuit 1112-5 may be incorporated into another element (for example, the main processor 1111 or the controller 1112-1). At least one of the data conversion circuit 1112-2, the gamma correction circuit 1112-3, or the rendering circuit 1112-4 may be integrated into a source driver 1143 to be described later.

The memory 1120 may store various data used by at least one element (for example, the processor 1110 or the sensor module 1161) of the electronic device 1000, as well as input data or output data for an instruction related thereto. The memory 1120 may include at least one of the volatile memory 1121 or the non-volatile memory 1122.

The input module 1130 may receive an instruction or data to be used for an element (for example, the processor 1110, the sensor module 1161, or the sound output module 1163) of the electronic device 1000 from the outside of the electronic device 1000 (for example, a user or the external electronic device 2000).

The input module 1130 may include a first input module 1131 to which an instruction or data is input from a user and a second input module 1132 to which an instruction or data is input from the external electronic device 2000. The first input module 1131 may include a microphone, a mouse, a keyboard, a key (for example, a button), or a pen (for example, a passive pen or active pen). The second input module 1132 may support a designated protocol that may be connected to the external electronic device 2000 by wire or wirelessly. According to an embodiment, the second input module 1132 may include a high definition multimedia interface (HDMI), a universal serial bus (USB) interface, an SD card interface, or an audio interface. The second input module 1132 may include a connector that may be physically connected to the external electronic device 2000, for example, an HDMI connector, a USB connector, an SD card connector, or an audio connector (for example, a headphone connector).

The display module 1140 visually provides information to the user. The display module 1140 may include a display panel 1141, a gate driver 1142, and a source driver 1143. The gate driver 1142 may have a configuration corresponding to at least a portion of the scan driver 120 shown in FIG. 5. The source driver 1143 may have a configuration corresponding to at least a portion of the data driver 130 shown in FIG. 5. The display module 1140 may further include a window, a chassis, and/or a bracket to protect the display panel 1141.

The display panel 1141 (or a display) may include a liquid crystal display panel, an organic light emitting display panel, or an inorganic light emitting display panel. However, the type of display panel 1141 is not particularly limited thereto. The display panel 1141 may be a rigid type, or a flexible type that may be rolled or folded. The display module 1140 may further include a supporter, a bracket, or a heat dissipation member for supporting the display panel 1141.

The gate driver 1142 may be mounted on the display panel 1141 as a driving chip, or may be integrated in the display panel 1141. For example, the gate driver 1142 includes an amorphous silicon TFT gate driver circuit (ASG), a low temperature polycrystaline silicon (LTPS) TFT gate driver circuit, or an oxide semiconductor TFT gate driver circuit (OSG) that is embedded in the display panel 1141. The gate driver 1142 receives a control signal from the controller 1112-1, and outputs scan signals to the display panel 1141 in response to the control signal.

The source driver 1143 receives a control signal from the controller 1112-1, converts image data into an analog voltage (for example, a data signal) in response to the control signal, and outputs data signals to the display panel 1141.

The source driver 1143 may be integrated into another element (for example, the controller 1112-1). The functions of the interface conversion circuit and the timing control circuit of the controller 1112-1 described above may be integrated into the source driver 1143.

The display module 1140 may further include a voltage generation circuit. The voltage generation circuit may output various voltages required for driving the display panel 1141. In the embodiment, the display panel 1141 may include a plurality of pixel arrays each including a plurality of pixels.

In an embodiment, the source driver 1143 may convert data corresponding to red (R), green (G), and blue (B) included in the image data received from the processor 1110 into a red data signal (or data voltage), a green data signal, and a blue data signal to provide them to the plurality of pixel arrays included in the display panel 1141 during one horizontal period.

The power module 1150 supplies power to the elements of the electronic device 1000. The power module 1150 may include a battery in which a power voltage is charged. The battery may include a non-rechargeable primary battery, or a rechargeable battery or fuel cell. The power module 1150 may include a power management integrated circuit (PMIC). The PMIC supplies optimized power to each of the above-described modules and subsequently described modules. The power module 1150 may include a wireless power transmission/reception member electrically connected to a battery. The wireless power transmission/reception member may include a plurality of antenna radiators in a form of a coil.

The electronic device 1000 may further include an internal module 1160 and an external module 1170. The internal module 1160 may include the sensor module 1161, the antenna module 1162, and the sound output module 1163. The external module 1170 may include a camera module 1171, a light module 1172, and the communication module 1173.

The sensor module 1161 may sense input by a user's body or input by the first input module 1131 (for example, the pen), and may generate an electrical signal or a data value corresponding to the input. The sensor module 1161 may include at least one of the fingerprint sensor 1161-1, the input sensor 1161-2, or the digitizer 1161-3

The fingerprint sensor 1161-1 may generate a data value corresponding to a user's fingerprint. The fingerprint sensor 1161-1 may include either an optical type or a capacitive type fingerprint sensor.

The input sensor 1161-2 may generate a data value corresponding to coordinate information of input by the user's body or input by the first input module 1131. The input sensor 1161-2 generates a data value based on an amount of change in capacitance caused by the input. The input sensor 1161-2 may sense input from a passive pen, or may transmit and receive data with an active pen.

The input sensor 1161-2 may measure a biometric signal such as blood pressure, hydration level, or body fat. For example, when the user touches a part of the body to the sensor layer or the sensing panel and does not move for a certain period of time, the input sensor 1161-2 may sense a biometric signal based on a change in an electric field caused by the part of the body and output desired information to the display module 1140.

The digitizer 1161-3 may generate a data value corresponding to coordinate information of a pen input. The digitizer 1161-3 generates a data value based on a change in an electromagnetic field caused by the input. The digitizer 1161-3 may sense input from the passive pen, or may transmit and receive data with the active pen.

At least one of the fingerprint sensor 1161-1 the input sensor 1161-2, or the digitizer 1161-3 may be implemented as a sensor layer disposed on the display panel 1141 through a continuous process. At least one of the fingerprint sensor 1161-1, the input sensor 1161-2, or the digitizer 1161-3 may be disposed on an upper side of the display panel 1141, and the other sensor module 1161 among the fingerprint sensor 1161-1, the input sensor 1161-2, and the digitizer 1161-3 (for example, the digitizer 1161-3) may be disposed on a lower side of the display panel 1141.

At least two or more of the fingerprint sensor 1161-1, the input sensor 1161-2, and the digitizer 1161-3 may be integrated into one sensing panel through the same manufacturing process. When integrated into one sensing panel, the sensing panel may be placed between the display panel 1141 and a window disposed above the display panel 1141. As another example, the sensing panel may be disposed on the window. However, the position of the sensing panel according to an embodiment is not particularly limited thereto.

At least one of the fingerprint sensor 1161-1, the input sensor 1161-2, or the digitizer 1161-3 may be embedded in the display panel 1141. That is, at least one of the fingerprint sensor 1161-1, the input sensor 1161-2 or the digitizer 1161-3 may be simultaneously formed through the process of forming elements (for example, a light emitting element, a transistor, and the like) included in the display panel 1141.

In addition, the sensor module 1161 may generate an electrical signal or a data value corresponding to an internal state or an external state of the electronic device 1000. The sensor module 1161 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas for transmitting or receiving a signal or power to and from the outside. According to an embodiment, the communication module 1173 may transmit a signal to an external electronic device or receive a signal from an external electronic device through an antenna suitable for a communication method. An antenna pattern of the antenna module 1162 may be integrated into one element (for example, the display panel 1141) of the display module 1140 or the input sensor 1161-2.

The sound output module 1163 is a device for outputting a sound signal to the outside of the electronic device 1000, and may include, for example, a speaker used for general purposes such as multimedia playback or recording playback, and a receiver used exclusively for receiving calls. According to an embodiment, the receiver may be provided integrally with or separately from the speaker. A sound output pattern of the sound output module 1163 may be integrated into the display module 1140.

The camera module 1171 may capture still images and moving images. According to an embodiment, the camera module 1171 may include one or more lenses, image sensors, or image signal processors. The camera module 1171 may further include an infrared camera capable of measuring the presence or absence of the user, the position of the user, and the gaze of the user.

The light module 1172 may provide light. The light module 1172 may include a light emitting diode or a xenon lamp. The light module 1172 may operate in conjunction with the camera module 1171 or may operate independently.

The communication module 1173 may support establishment of a wired or wireless communication channel between the electronic device 1000 and the external electronic device 2000, and communication through the established communication channel. The communication module 1173 may include a wireless communication module, such as a cellular communication module, a short range communication module, or a global navigation satellite system (GNSS) communication module, and/or a wired communication module such as a local area network (LAN) communication module or a power line communication module. The communication module 1173 may communicate with the external electronic device 2000 through a short range communication network such as Bluetooth, WiFi direct, or infrared data association (IrDA) or a long range communication network such as a cellular network, the Internet, or a computer network (for example, LAN or WAN). The various types of the communication modules 1173 described above may be implemented as a single chip or may be implemented as separate chips.

The input module 1130, the sensor module 1161, the camera module 1171, and the like may be used to control an operation of the display module 1140 in conjunction with the processor 1110.

The processor 1110 outputs an instruction or data to the display module 1140, the sound output module 1163, the camera module 1171, or the light module 1172 based on input data received from the input module 1130. For example, the processor 1110 may generate image data in response to input data provided through a mouse or an active pen and output it to the display module 1140. In addition, the processor 1110 may generate instruction data in response to the input data and output it to the camera module 1171 or light module 1172. When input data is not received from the input module 1130, the processor 1110 may reduce power consumed by the electronic device 1000 by changing an operation mode of the electronic device 1000 to a low power mode or a sleep mode.

The processor 1110 outputs an instruction or data to the display module 1140, the sound output module 1163, the camera module 1171, or the light module 1172 based on sensing data received from the sensor module 1161. For example, the processor 1110 may compare the input data acquired through the fingerprint sensor 1161-1 with authentication data stored in the memory 1120 and execute an application according to the comparison result. The processor 1110 may execute an instruction based on sensed data detected by the input sensor 1161-2 or the digitizer 1161-3, or may output corresponding image data to the display module 1140. When the sensor module 1161 includes a temperature sensor, the processor 1110 may receive temperature data from the sensor module 1161, and may further perform luminance correction on image data based on the temperature data.

The processor 1110 may receive measurement data about the presence of a user, a user's position, a user's gaze, and the like, from the camera module 1171. The processor 1110 may further perform luminance correction on image data based on the measurement data. For example, the processor 1110 that determines the presence of a user through an input from the camera module 1171 may output image data, whose luminance is corrected through the data conversion circuit 1112-2 or the gamma correction circuit 1112-3, to the display module 1140.

Some of the above elements may be connected to each other through a communication method between peripheral devices, for example, a bus, a general purpose input/output (GPIO), a serial peripheral interface (SPI), a mobile industry processor interface (MIPI), or an ultra-path interconnect (UPI) link, to exchange a signal (for example, an instruction or data) with each other. The processor 1110 may communicate with the display module 1140 through a predefined interface. For example, the processor 1110 may use one of the above-described communication methods, but it is not limited to the above-described communication methods.

The electronic device 1000 may be various types of devices. The electronic device 1000 may include, for example, at least one of a portable communication device (for example, a smartphone), a computer device, a portable multimedia device, a portable medical device, a camera, a wearable device, or a home appliance. The electronic device 1000 according to an embodiment of the present specification is not limited to the above-described devices.

Figure 2:
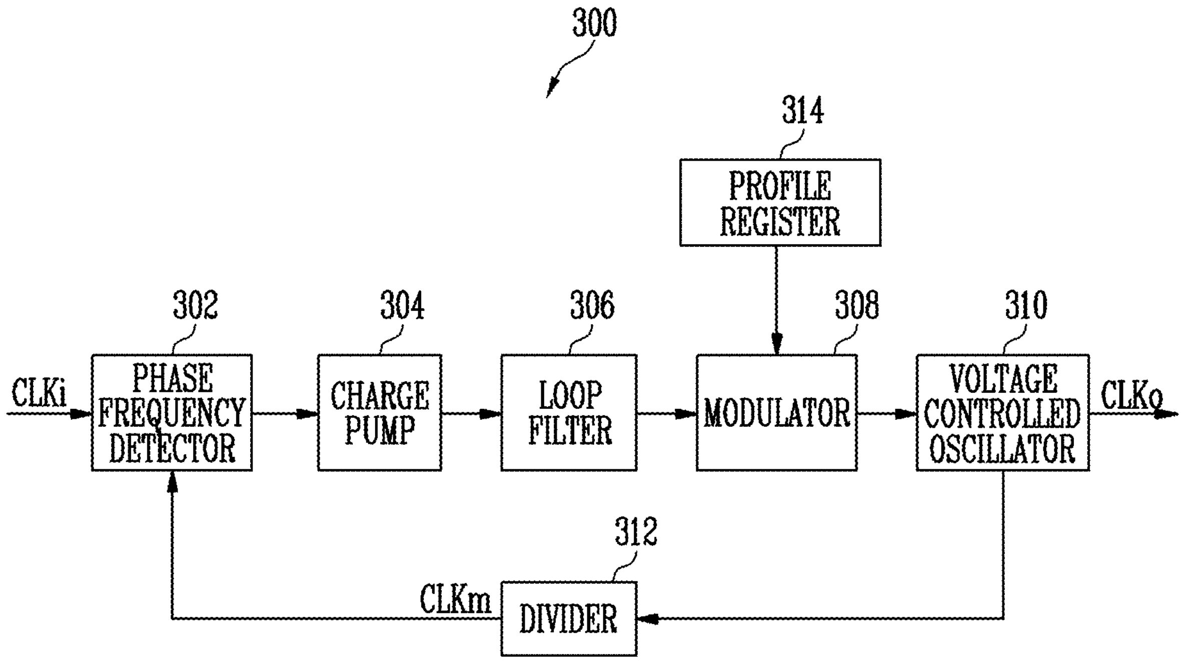
FIG. 2 illustrates a spread spectrum clock generator according to an embodiment.

FIG. 2 illustrates a spread spectrum clock generator according to an embodiment.

Referring to FIG. 2, a spread spectrum clock generator 300 may receive an input clock signal CLKi and generate an output clock signal CLKo (or a spread spectrum clock signal) by modulating a frequency of the received input clock signal CLKi.

The spread spectrum clock generator 300 may include a phase frequency detector 302, a charge pump 304, a loop filter 306, a modulator 308, a voltage controlled oscillator 310, a divider 312, and a profile register 314.

In an embodiment, the spread spectrum clock generator 300 may be included in the electronic device 1000 of FIG. 1. For example, the spread spectrum clock generator 300 may generate a clock signal for data communication of the electronic device 1000. For example, the interfaces for data communication of the electronic device 1000 may include, for example, universal serial bus (USB), peripheral component interconnect express (PCIe), secure digital input/output (SDIO), secure digital card (SDC), mobile industry processor interface (MIPI), or ultra path interconnect (UPI), but the present disclosure is not limited thereto.

The phase frequency detector 302 may receive the input clock signal CLKi and a divided clock signal CLKm output from the divider 312, and output a phase frequency signal representing a phase difference and a frequency difference between the input clock signal CLKi and the divided clock signal CLKm.

The charge pump 304 may receive a phase frequency signal and supply a voltage (or current) signal corresponding to the received phase frequency signal to the loop filter 306.

The loop filter 306 may filter (for example, low-pass filter) the voltage (or current) signal provided from the charge pump 304. For example, the loop filter 306 may filter noise included in the voltage (or current) signal.

The profile register 314 may store a bit value with respect to a spread spectrum method and a bit value with respect to a spread ratio. In addition, the profile register 314 may store a bit value corresponding to a predetermined time period so that the spread spectrum method may be changed at regular intervals (that is, in the predetermined time period). The spread ratio may correspond to the spread bandwidth of the output clock signal CLKo output from the voltage controlled oscillator 310.

The modulator 308 may receive a spread spectrum method, a spread ratio, and a predetermined time period from the profile register 314. The modulator 308 may modulate the voltage provided from the loop filter 306 in response to the spread spectrum method and the spread ratio, and may supply the modulated voltage to the voltage controlled oscillator 310. Here, the modulator 308 may generate a modulation voltage by changing the spread spectrum method at regular intervals (i.e., in the predetermined time period).

The voltage controlled oscillator 310 may generate a frequency modulated output clock signal CLKo by performing an oscillation in response to the modulated voltage.

The divider 312 may generate the divided clock signal CLKm by dividing the output clock signal CLKo, and may provide the divided clock signal CLKm to the phase frequency detector 302.

Figure 3:
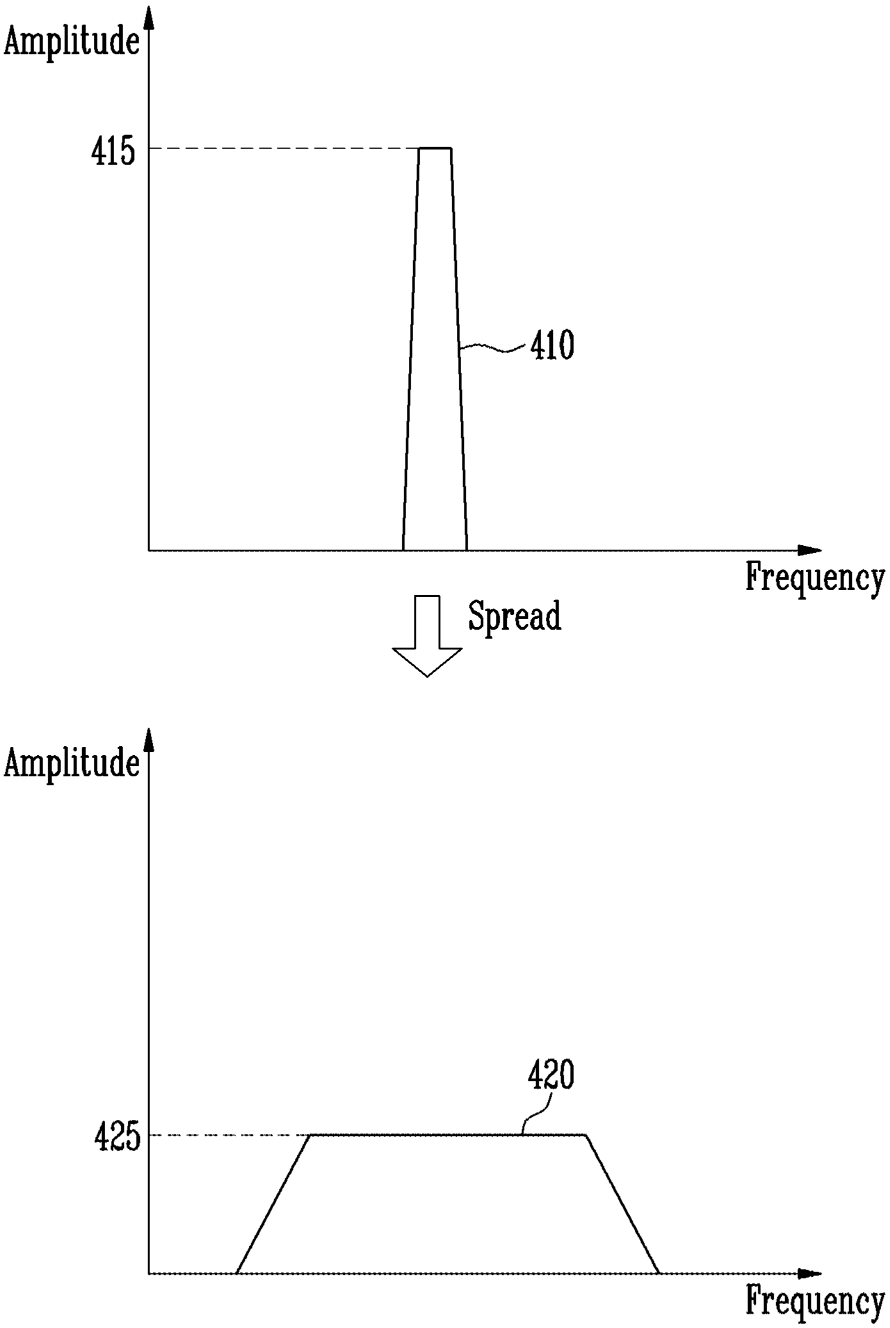
FIG. 3 illustrates a frequency bandwidth distribution corresponding to a spread spectrum method.

FIG. 3 illustrates a frequency bandwidth distribution corresponding to a spread spectrum method.

FIG. 3 illustrates a first frequency domain signal 410 to which the spread spectrum method is not applied and a second frequency domain signal 420 to which the spread spectrum method is applied. For example, areas of the first frequency domain signal 410 and the second frequency domain signal 420 may be the same. Accordingly, the energies in the first frequency domain signal 410 and the second frequency domain signal 420 may be the same.

In an embodiment, the second frequency domain signal 420 may have a wider frequency bandwidth than the first frequency domain signal 410. In this case, a peak value 425 of the second frequency domain signal 420 may be set to be lower than a peak value 415 of the first frequency domain signal 410. Therefore, when a clock signal (for example, the output clock signal CLKo) for data communication is generated using the spread spectrum clock generator 300, EMI may be reduced.

Figure 4A:
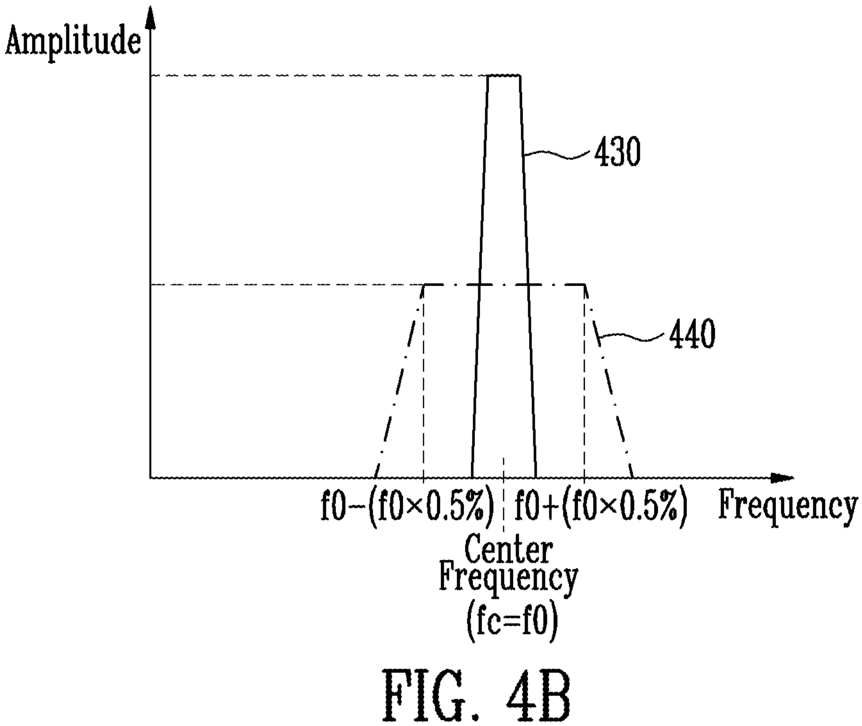
FIGS. 4A, 4B, and 4C illustrate an embodiment of a spread spectrum method.
Figure 4B:
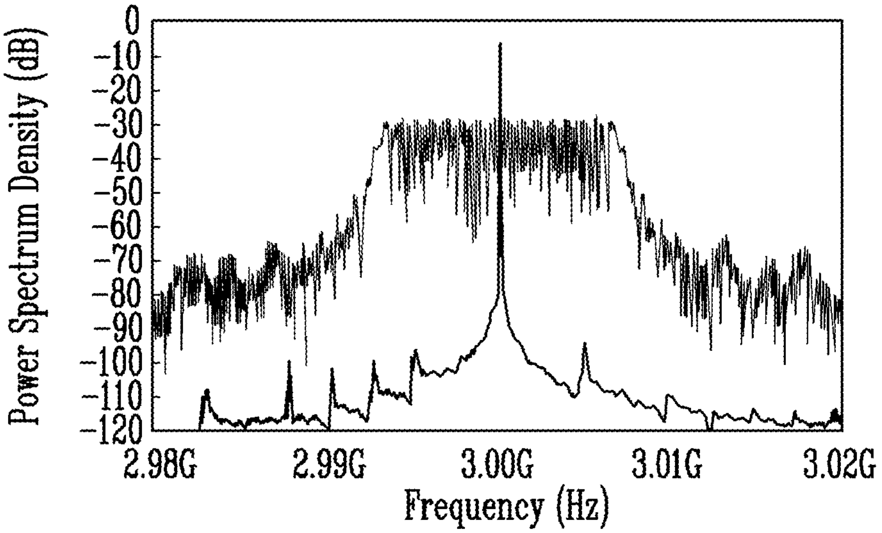
Figure 4C:
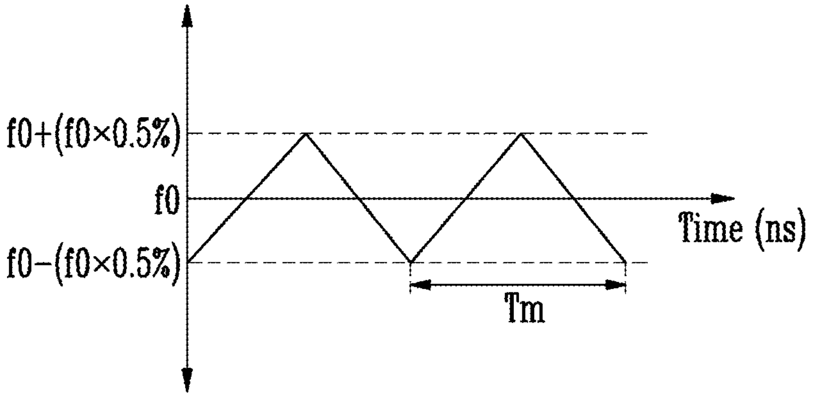

FIGS. 4A, 4B, and 4C illustrate an embodiment of a spread spectrum method.

FIG. 4A illustrates a first frequency domain signal 430 to which the spread spectrum method is not applied and a second frequency domain signal 440 to which the spread spectrum method (for example, center spread method) is applied. In addition, FIG. 4B illustrates a simulation result of the spread spectrum method. When the spread ratio is 1% and the center frequency is f0, in the center spread method, the second frequency domain signal 440 may have a frequency band from $f0-(f0\times0.5\%)$ to $f0+(f0\times0.5\%)$.

FIG. 4C illustrates a triangular wave modulation profile. The modulation profile is a curve that represents the frequency variation of the output clock signal CLKo observed over time. The frequency of the output clock signal CLKo may be varied between $f0-(f0\times0.5\%)$ and $f0+(f0\times0.5\%)$ depending on the modulation period Tm. In FIG. 4C, the modulation frequency corresponds to 1/Tm. FIG. 4C illustrates an example of performing spread spectrum modulation in the form of a triangular wave, but spread spectrum modulation may be performed in the form of a sinusoidal wave or in an irregular form.

Figure 5:
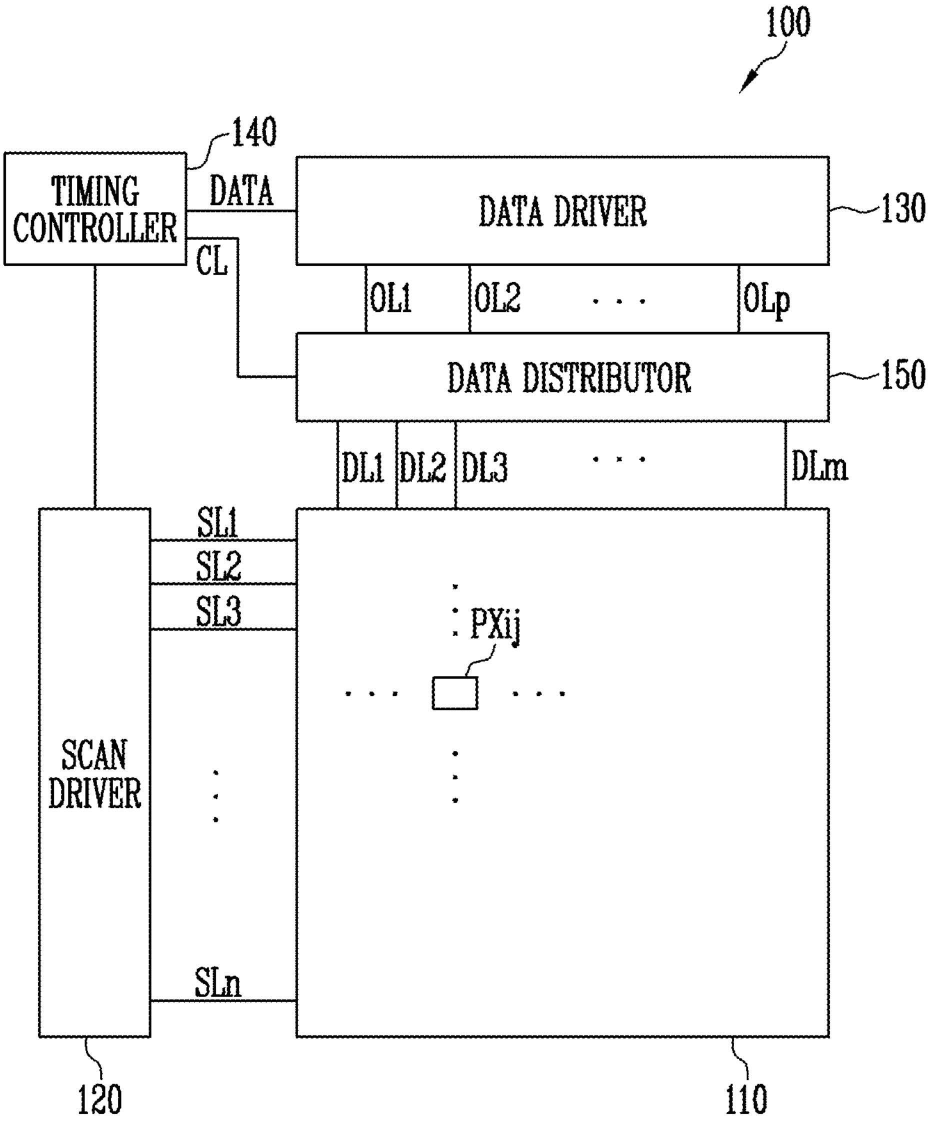
FIG. 5 illustrates a display device according to an embodiment.

FIG. 5 illustrates a display device according to an embodiment.

Referring to FIG. 5, a display device 100 may include a display portion 110 (or a display panel), a scan driver 120, a data driver 130 (or a source driver), a timing controller 140 (or a processor), and a data distributor 150. For example, the timing controller 140 and the data driver 130 may be connected to each other through a first interface such as MIPI or UPI.

The timing controller 140 may receive input data and control signals for each frame from an external processor (for example, the processor 1110 of FIG. 1). The timing controller 140 may correct the input data to generate output data DATA (or image data), and may supply the output data DATA to the data driver 130. In addition, the timing controller 140 may control the scan driver 120, the data driver 130, and the data distributor 150 in response to control signals.

In an embodiment, the timing controller 140 may include the spread spectrum clock generator 300 shown in FIG. 2. The output clock signal CLKo (or clock signal) generated by the spread spectrum clock generator 300 may be used inside the timing controller 140. In addition, the output clock signal CLKo generated by the spread spectrum clock generator 300 may be supplied to the data driver 130. For example, the output clock signal CLKo may be embedded in the output data DATA and supplied to the data driver 130.

In the embodiment, the timing controller 140 may transmit the output data DATA to the data driver 130 at a data rate corresponding to the output clock signal CLKo by using the output clock signal CLKo. Since the frequency of the output clock signal CLKo is varied over time by the spread spectrum clock generator 300, the data rate may also be varied over time. That is, the timing controller 140 may vary the data rate.

In an embodiment, the timing controller 140 controls the data distributor 150 using an enable control signal CL (or a control signal), and may periodically vary the output time of the enable control signal CL in response to the data rate. Details of changing the output time of the enable control signal CL will be described later with reference to FIG. 10 to FIG. 15.

The data driver 130 may generate data signals corresponding to the output data DATA and output the data signals through output terminals (or an output buffer or channel). The output terminals of the data driver 130 may be connected to output lines (OL1, OL2, . . . , OLp), respectively (where p is a natural number greater than or equal to 3 and less than or equal to m). For example, the data driver 130 may sample output data using a clock signal and supply data signals corresponding to the output data to the output lines OL1 to OLp. Here, the clock signal may be the output clock signal CLKo provided from the timing controller 140 (or a clock signal restored from the output data DATA in which the output clock signal CLKo is embedded). The data driver 130 may output data signals to the output lines OL1 to OLp at a predetermined time, which is set based on the clock signal (for example, for one horizontal period).

The data distributor 150 may be connected to the data driver 130 (or the output terminal of the data driver 130) via the output lines OL1 to OLp. The data distributor 150 may be connected to pixels via data lines (DL1, DL2, DL3, . . . , DLm) (where m is a natural number greater than or equal to 4). The data distributor 150 may include a plurality of demultiplexers.

The data distributor 150 may selectively connect the output lines OL1 to OLp (or the output terminal of the data driver 130) to the data lines DL1 to DLm. For example, in response to the enable control signal CL of the timing controller 140, the data distributor 150 may electrically connect each of the output lines OL1 to OLp to two or more data lines (two or more of DL1 to DLm) for one horizontal period. Each of the data lines DL1 to DLm may receive a data signal from one of the output lines OL1 to OLp connected thereto for one horizontal period.

The scan driver 120 may receive a clock signal and a scan start signal from the timing controller 140. The scan driver 120 may supply an enable scan signal to the scan lines (SL1, SL2, SL3, . . . , SLn) (where n is a natural number greater than 4) by shifting the scan start signal in response to the clock signal. Here, the enable scan signal may correspond to the gate-on voltage of the transistor. For example, when the enable scan signal is supplied to a P-type transistor, the enable scan signal may be set to a logic low voltage.

The display portion 110 may include pixels connected to the scan lines SL1 to SLn and the data lines DL1 to DLm. The pixels may be arranged in a Pentile™ form, but the pixel arrangement of the present disclosure is not limited thereto. Each pixel PXij may be connected to data and scan lines corresponding thereto (where i and j are natural numbers greater than 0). The pixel PXij may mean a pixel connected to an i-th scan line and a j-th data line.

In an embodiment, the timing controller 140 may vary the data rate periodically by at least one frame. In addition, the timing controller 140 may vary the output time of the enable control signal CL periodically by at least one frame in response to the data rate.

Figure 6:
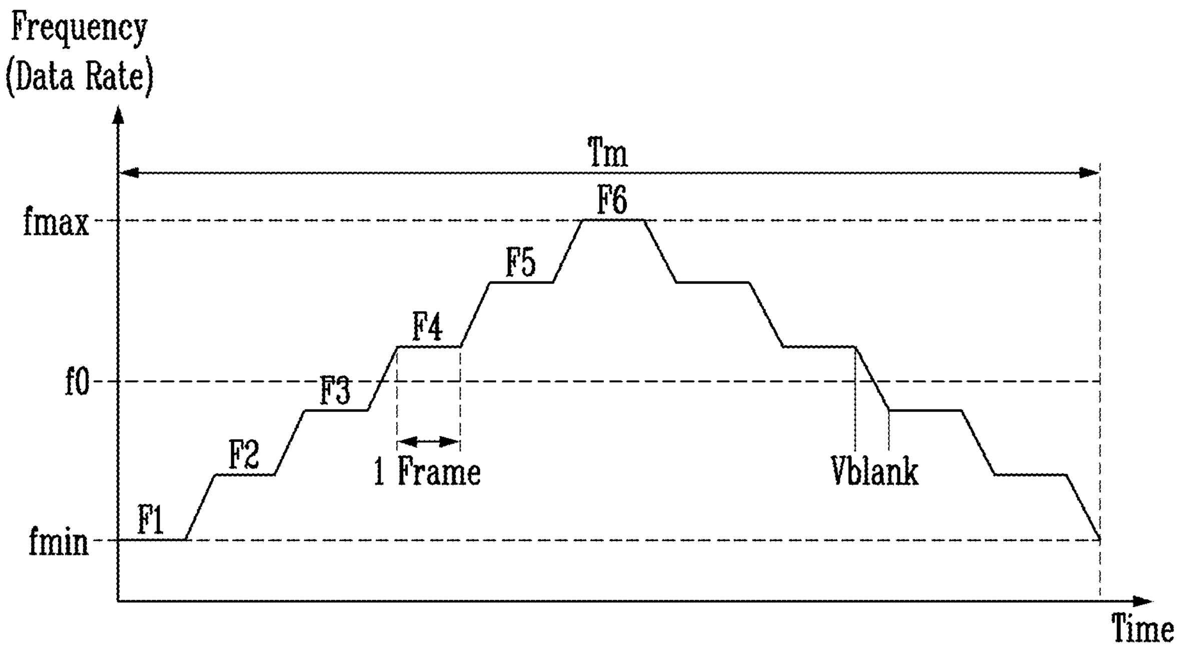
FIG. 6 illustrates an embodiment of a clock signal generated by a timing controller of FIG. 5.

FIG. 6 illustrates an embodiment of a clock signal generated by a timing controller of FIG. 5. The clock signal may be the output clock signal CLKo generated by the spread spectrum clock generator 300 of FIG. 2.

Referring to FIG. 2, FIG. 5, and FIG. 6, the timing controller 140 may vary the frequency of the clock signal in the range from a minimum frequency fmin to a maximum frequency fmax in a stepwise manner. For example, the minimum frequency fmin may be about 15% less than the center frequency f0, and the maximum frequency fmax may be about 15% greater than the center frequency f0. That is, the timing controller 140 may gradually vary the frequency of the clock signal within about ±15% with respect to the center frequency f0. However, this is an example, and the variable range of the frequency may be changed in various ways depending on the specifications of the timing controller 140 and the data driver 130.

As the frequency of the clock signal varies stepwise, the data rate may also vary stepwise. For example, when the clock signal with the center frequency f0 is used, the data rate may be about 2.6 Gbps. When the clock signal with the minimum frequency fmin is used, the data rate may be about 2.2 Gbps, and when the clock signal with the maximum frequency fmax is used, the data rate may be about 3.0 Gbps. That is, the timing controller 140 may vary the data rate within the range from 2.2 to 3.0 Gbps. However, this is an example, and the variable range of the data rate is not limited thereto.

In an embodiment, the timing controller 140 may vary the frequency of the clock signal and the data rate corresponding to the frequency of the clock signal at least once every frame (or every frame period). For example, the timing controller 140 may vary the frequency of the clock signal and data rate in every frame. For example, the timing controller 140 may output data at the minimum data rate corresponding to the minimum frequency fmin during the first frame F1. The timing controller 140 may vary the data rate in the vertical blank Vblank (or vertical blank period between frame periods), and output data at a faster data rate than in the first frame F1 during the second frame F2. As shown in FIG. 6, in the third frame F3, the fourth frame F4, the fifth frame F5, and the sixth frame F6, the data rate may increase stepwise up to the maximum data rate corresponding to the maximum frequency fmax. After the sixth frame F6, as shown in FIG. 6, the data rate may decrease stepwise from the maximum data rate to a minimum data rate.

Figure 7:
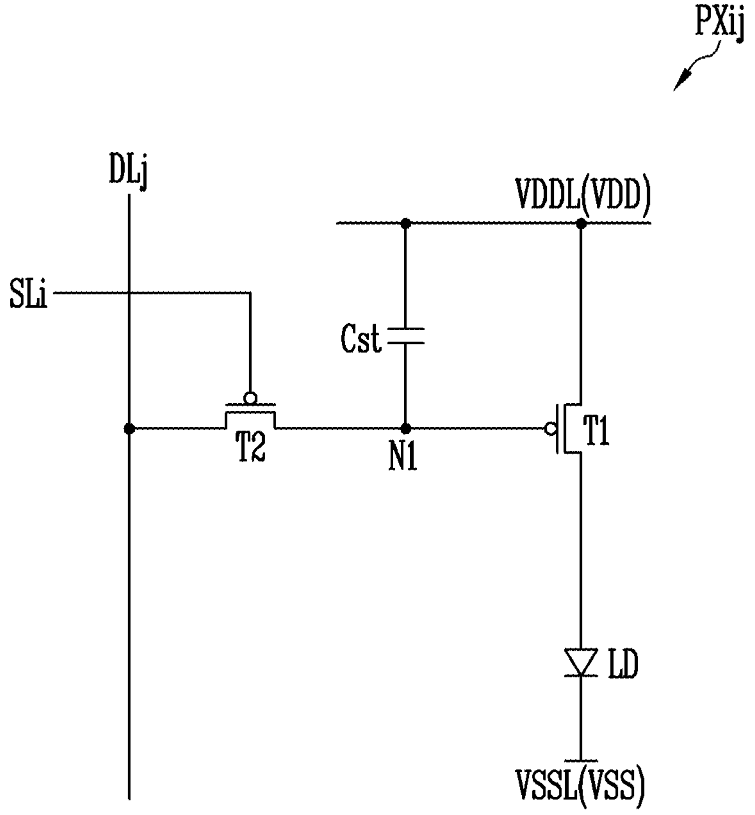
FIG. 7 illustrates an embodiment of a pixel included in the display device of FIG. 5.

FIG. 7 illustrates an embodiment of a pixel included in the display device of FIG. 5.

Referring to FIG. 7, the pixel PXij may be a pixel that emits light of a first color. Pixels emitting light of a second color or light of a third color may include substantially the same configuration as the pixel PXij except for the light emitting element LD, so redundant descriptions will be omitted.

For example, the first color may be one of red, green, and blue. The second color may be one other than the first color among red, green, and blue, and the third color may be one other than the first color and the second color among red, green, and blue. In addition, magenta, cyan, and yellow may be used instead of red, green, and blue as the first to third colors.

The pixel PXij may include a plurality of transistors including a first transistor T1 and a second transistor T2, a storage capacitor Cst, and a light emitting element LD. The transistors T1 and T2 are shown as P-type transistors, for example, PMOS, but a person skilled in the art will be able to configure a pixel circuit that performs the same functions using N-type transistors, for example, NMOS.

A first electrode of the first transistor T1 may be connected to a first power line VDDL, and a second electrode thereof may be connected to a first electrode (or an anode electrode) of the light emitting element LD. In addition, a gate electrode of the first transistor T1 may be connected to a first node N1. The first transistor T1 may control an amount of current between the first power line VDDL and a second power line VSSL via the light emitting element LD in response to a voltage of the first node N1. A first driving power VDD may be supplied to the first power line VDDL, and a second driving power VSS may be supplied to the second power line VSSL. When the pixel PXij is set to a light emitting state, the first driving power VDD may be set to a voltage higher than the second driving power VSS.

A first electrode of the second transistor T2 may be connected to a data line DLj, and a second electrode thereof may be connected to the first node N1. In addition, a gate electrode of the second transistor T2 may be connected to a scan line SLi. The second transistor T2 is turned on when an enable scan signal is supplied to the gate electrode of the second transistor T2 through the scan line SLi, allowing the data line DLj and the first node N1 to be electrically connected.

The storage capacitor Cst may be connected between the first power line VDDL and the first node N1. The storage capacitor Cst may store a voltage of the first node N1.

The first electrode (or the anode electrode) of the light emitting element LD may be connected to the second electrode of the first transistor T1, and a second electrode (or a cathode electrode) of the light emitting element LD may be connected to the second power line VSSL. The light emitting element LD may emit light of a first color with a predetermined luminance in response to the amount of current supplied from the first transistor T1.

The light emitting element LD may be implemented as an organic light emitting diode, or an inorganic light emitting diode such as a micro light emitting diode or a quantum dot light emitting diode. In addition, the light emitting element LD may be an element in which an organic material and an inorganic material are complexly formed. Although only one light emitting device LD is shown in the present embodiment, a plurality of sub-light emitting elements may be connected in series, in parallel, or in series and parallel to replace the light emitting element LD.

The embodiment of the present disclosure is not limited to the pixel of FIG. 7, and the display portion 110 may include pixels with various circuit configurations that are currently known.

Figure 8:
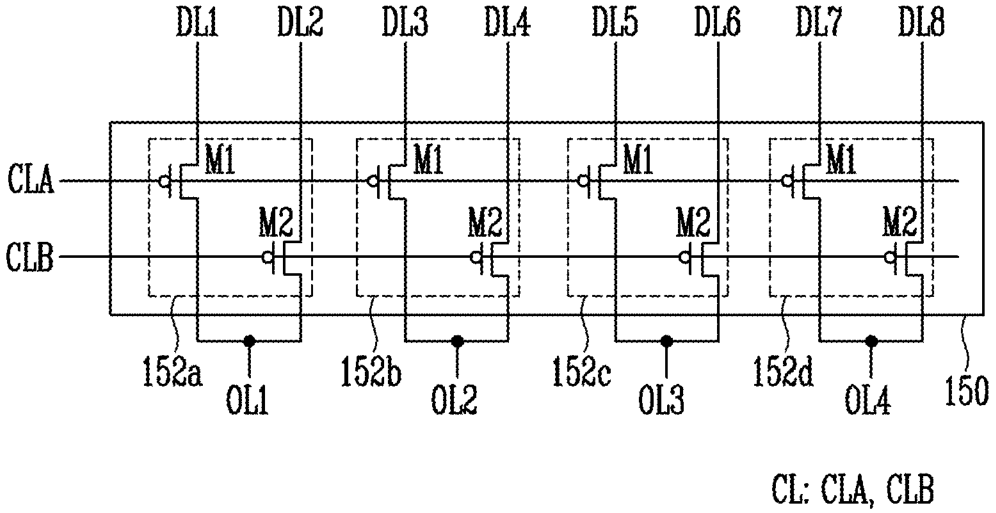
FIG. 8 illustrates an embodiment of a data distributor included in the display device of FIG. 5.

FIG. 8 illustrates an embodiment of a data distributor included in the display device of FIG. 5.

Referring to FIG. 8, the data distributor 150 may include a plurality of demultiplexers 152*a*, 152*b*, 152*c*, and 152*d*. Each of the demultiplexers 152*a*, 152*b*, 152*c*, and 152*d* may transmit two data signals, which are supplied from one of output lines OL1 to OL4, to two of data lines DL1 to DL8. That is, each of the demultiplexers 152*a*, 152*b*, 152*c*, and 152*d* may be a 1:2 demultiplexer.

The first demultiplexer 152*a* may time-divide a data signal from the first output line OL1 to supply it to the first data line DL1 and the second data line DL2. The second demultiplexer 152*b* may time-divide a data signal from the second output line OL2 to supply it to the third data line DL3 and the fourth data line DL4. The third demultiplexer 152*c* may time-divide a data signal from the third output line OL3 to supply it to the fifth data line DL5 and the sixth data line DL6. The fourth demultiplexer 152*d* may time-divide a data signal from the fourth output line OL4 to supply it to the seventh data line DL7 and the eighth data line DL8.

Each of the demultiplexers 152*a*, 152*b*, 152*c*, and 152*d* may include a first transistor M1 and a second transistor M2. The first transistor M1 may be connected between the output lines OL1 to OL4 and the odd-numbered data lines DL1, DL3, DL5, and DL7. The first transistor M1 may be turned on by the first enable control signal CLA supplied from the timing controller 140. Here, the first enable control signal CLA may have a gate-on voltage which turns on the first transistor M1. For example, when the first transistor M1 is a P-type transistor, the first enable control signal CLA may have a low level (or a logic low level). The gate-off voltage that turns off the first transistor M1 may be a high level (or a logic high level).

The second transistor M2 may be connected between the output lines OL1 to OL4 and the even-numbered data lines DL2, DL4, DL6, and DL8. The second transistor M2 may be turned on by the second enable control signal CLB supplied from the timing controller 140. Here, the second enable control signal CLB may have a gate-on voltage which turns on the second transistor M2. For example, when the second transistor M2 is a P-type transistor, the second enable control signal CLB may have a logic low level.

Figure 9:
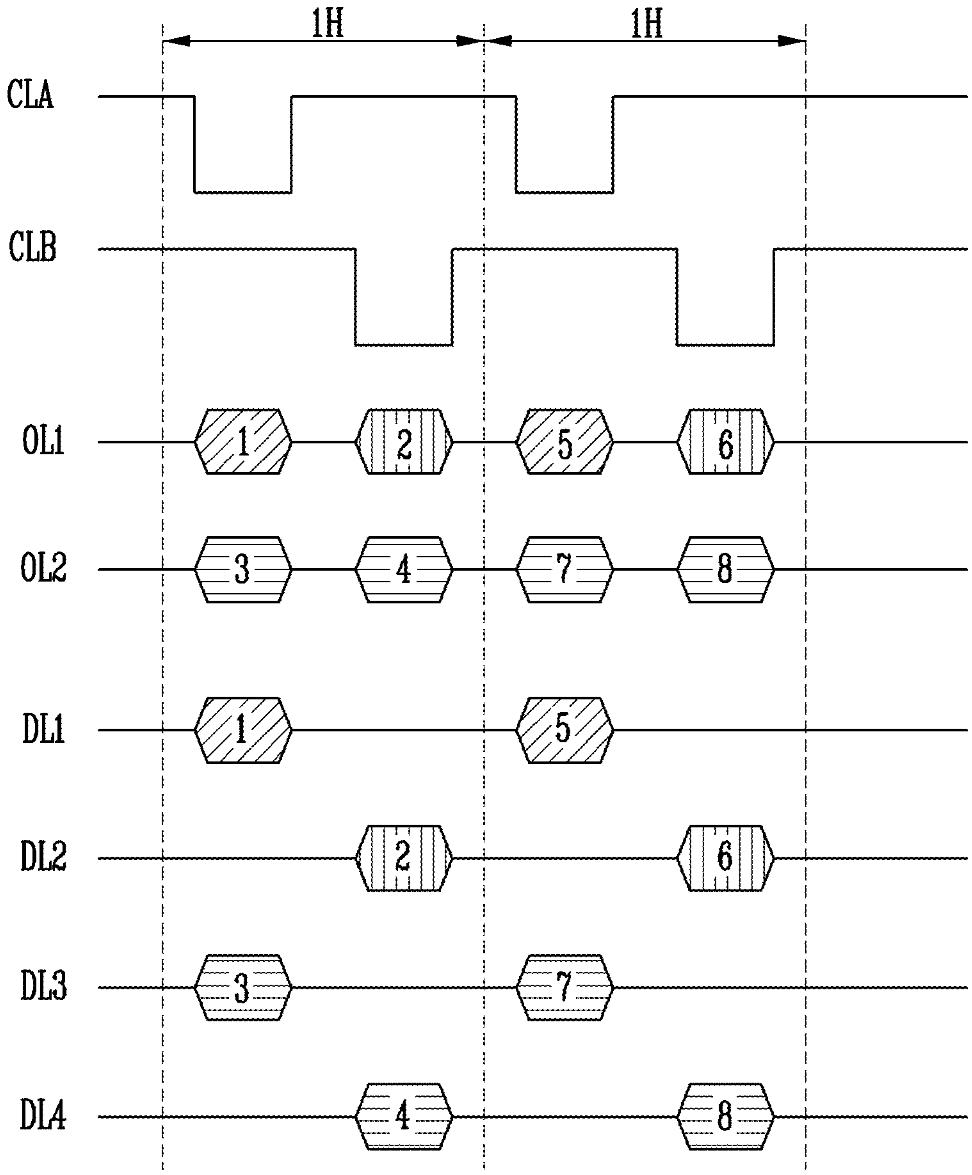
FIG. 9 illustrates data signals supplied to data lines by the data distributor of FIG. 8.

FIG. 9 illustrates data signals supplied to data lines by the data distributor of FIG. 8.

Referring to FIG. 9, the first enable control signal CLA and the second enable control signal CLB may be sequentially supplied during a horizontal period 1H. For example, the second enable control signal CLB may be supplied after the first enable control signal CLA is supplied during the horizontal period 1H. The second enable control signal CLB may have the same waveform as the first enable control signal CLA, but may have a different phase from the first enable control signal CLA. The second enable control signal CLB may be a signal that is delayed by a specific time (or phase) from the first enable control signal CLA. It is assumed that the first to fourth pixels (1 to 4) are sequentially disposed on the first horizontal line or connected to the first scan line SL1 of FIG. 5, and the fifth to eighth pixels (5 to 8) are sequentially disposed on the second horizontal line or connected to the second scan line SL2 of FIG. 5.

When the gate-on voltage of the first enable control signal CLA is supplied during the first horizontal period, the first transistor M1 (see FIG. 8) is turned on. When the first transistor M1 is turned on, the first output line OL1 may be electrically connected to the first data line DL1, and the second output line OL2 may be electrically connected to the third data line DL3. In this case, the data signal supplied to the first output line OL1 may be supplied to the first pixel 1 via the first data line DL1, and the data signal supplied to the second output line OL2 may be supplied to the third pixel 3 via the third data line DL3.

When the gate-on voltage of the second enable control signal CLB is supplied during the first horizontal period, the second transistor M2 is turned on. When the second transistor M2 is turned on, the first output line OL1 may be electrically connected to the second data line DL2, and the second output line OL2 may be electrically connected to the fourth data line DL4. In this case, the data signal supplied to the first output line OL1 may be supplied to the second pixel 2 via the second data line DL2, and the data signal supplied to the second output line OL2 may be supplied to the fourth pixel 4 via the fourth data line DL4.

When the gate-on voltage of the first enable control signal CLA is supplied during the second horizontal period, the first transistor M1 is turned on. In this case, the data signal supplied to the first output line OL1 may be supplied to the fifth pixel 5 via the first data line DL1, and the data signal supplied to the second output line OL2 may be supplied to the seventh pixel 7 via the third data line DL3.

When the gate-on voltage of the second enable control signal CLB is supplied during the second horizontal period, the second transistor M2 is turned on. In this case, the data signal supplied to the first output line OL1 may be supplied to the sixth pixel 6 via the second data line DL2, and the data signal supplied to the second output line OL2 may be supplied to the eighth pixel 8 via the fourth data line DL4.

Figure 10:
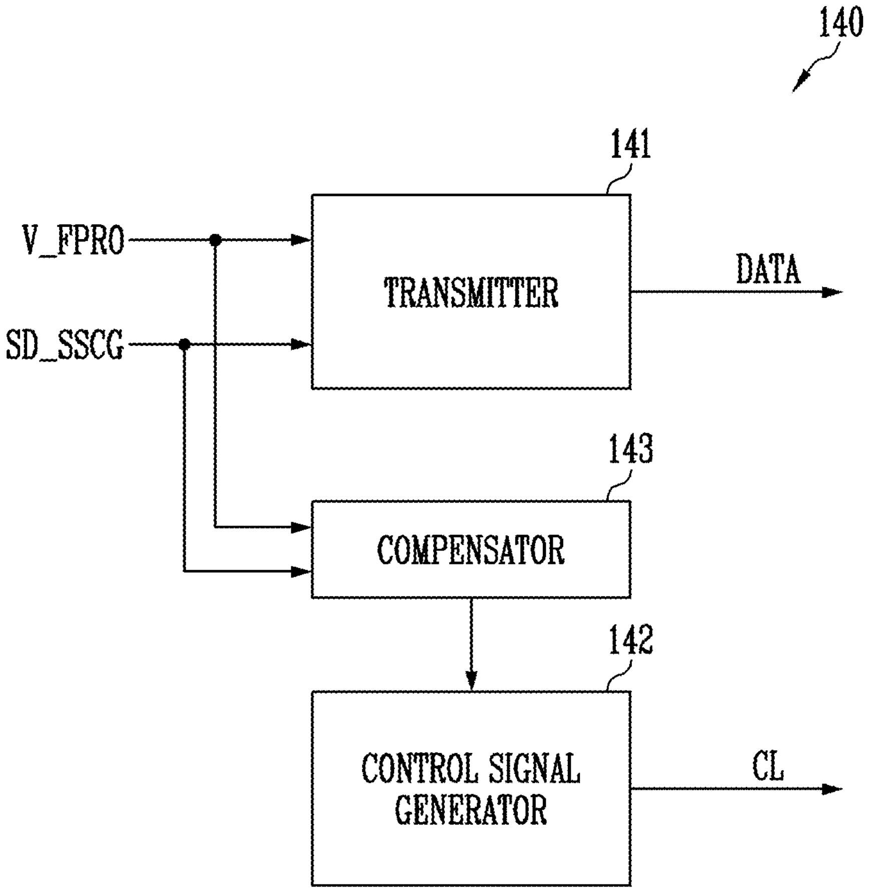
FIG. 10 illustrates an embodiment of a timing controller included in the display device of FIG. 5.

FIG. 10 illustrates an embodiment of the timing controller included in the display device of FIG. 5. FIG. 10 schematically illustrates the timing controller, focusing on the function of generating an enable control signal.

Referring to FIG. 10, the timing controller 140 may include a transmitter 141, a control signal generator 142, and a compensator 143.

The transmitter 141 may transmit the output data DATA to the data driver 130 (see FIG. 5). For example, the transmitter 141 may support an interface such as MIPI or UPI. The data driver 130 may include a receiver corresponding to the transmitter 141.

The transmitter 141 may transmit the output data DATA while varying the data rate by using the output clock signal CLKo of the spread spectrum clock generator 300 of FIG. 2.

The control signal generator 142 may generate the enable control signal CL. For example, the control signal generator 142 may generate the enable control signal CL based on an internally generated clock signal (or an internal clock signal) for the self-operation of the timing controller 140. For example, the control signal generator 142 may be implemented through programming of the timing controller 140 implemented as an integrated circuit. The control signal generator 142 may output the enable control signal CL in a manner separate (or independent) from the interface of the transmitter 141, for example, via GPIO. For example, the enable control signal CL may be a GPIO signal.

The compensator 143 may compensate for the enable control signal CL (or the output time or period of the enable control signal CL) based on the data rate.

As will be described later with reference to FIG. 13 to FIG. 15, the output time (or transition time or period) of the enable control signal CL must match the output time of the data signal or have a certain relationship therewith. However, the output time of the enable control signal is determined by the internal clock signal, but the output time of the data signal is determined by the clock signal restored from the output data DATA (that is, the output clock signal CLKo of FIG. 2). When the data rate (and the restored clock signal corresponding thereto) varies, the output time of the data signal may be different from the output time of the enable control signal CL. Therefore, the compensator 143 may compensate for the enable control signal CL (or the output time or period of the enable control signal CL) based on the data rate to make sure that the output time of the data signal matches the output time of the enable control signal CL, regardless of the data signal.

Since the data signal is output in a horizontal period and the horizontal period is varied by the variation of the data rate, the compensator 143 may compensate for the output time (or period) of the enable control signal CL by the amount of change in the horizontal period according to the variation of the data rate.

For example, the compensator 143 may calculate a compensation value corresponding to the amount of change in the horizontal period and provide the compensation value to the control signal generator 142. In this case, the control signal generator 142 may generate an enable control signal CL by reflecting the compensation value.

In an embodiment, the compensator 143 may determine a compensation value for the enable control signal CL according to Equation 1 below.

$$CV = H_{(N+1)} - H_N = K \times V_{FPRO} \times \left( \frac{1}{\text{Rate}_{(N+1)}} - \frac{1}{\text{Rate}_N} \right) \quad \text{(Equation 1)}$$

Here, CV is a compensation value for the enable control signal CL or a timing that requires compensation for the output time (or period) of the enable control signal CL, $H_{N+1}$ is a horizontal period in a current frame (or an (N+1)-th frame), $H_N$ is a horizontal period in a previous frame (or an N-th frame), $V_{FPRO}$ is a frame protocol value V_FPRO or a setting value for the horizontal period, $\text{Rate}_{N+1}$ is a data rate in the current frame (that is, a current data rate), and $\text{Rate}_N$ is a data rate in the previous frame (that is, a previous data rate). K is a constant, which may be, for example, 6. The frame protocol value V_FPRO including a setting value (or information) for the horizontal period may be provided from the outside. In addition, the frame protocol value V_FPRO may be included in the output data DATA (or the frame protocol included in the output data DATA) and output from the transmitter 141.

In an embodiment, the compensator 143 may compensate for the enable control signal CL or determine the compensation value based on the data rate difference SD_SSCG and the frame protocol value V_FPRO. Here, the data rate difference SD_SSCG may be the difference between the data rate (or the reference data rate) in the previous frame and the data rate in the current frame. For example, the data rate (and data rate difference) may be calculated based on the spread ratio stored in the profile register 314 of FIG. 2, and the data rate difference may correspond to the step difference of the spread spectrum (e.g., the difference between the steps shown in FIG. 6).

In Equation 1, "$1/\text{Rate}_{N+1}-1/\text{Rate}_N$" is "$(\text{Rate}_N-\text{Rate}_{N+1})/(\text{Rate}_N*\text{Rate}_{N+1})$", and may be expressed as "$\text{SD\_SSCG}/(\text{Rate}_N*(\text{Rate}_N+\text{SD\_SSCG}))$" using the data rate difference SD_SSCG. Considering that the data rate difference SD_SSCG is smaller than the data rate (that is, $\text{Rate}_N$), "$1/\text{Rate}_{N+1}-1/\text{Rate}_N$" in Equation 1 may be similar to "$\text{SD\_SSCG}/\text{Rate}_N^2$". Accordingly, the compensator 143 may compensate for the period of the enable control signal CL in proportion to the data rate difference SD_SSCG. Through this approximation, a load in calculating the compensation value may be reduced.

In the embodiment, the compensator 143 may use a lookup table to compensate for the enable control signal CL or determine the compensation value. The lookup table may include compensation values according to the data rate (and the data rate difference SD_SSCG).

As described above, while the timing controller 140 generates the enable control signal CL based on the internal clock signal, the timing controller 140 may compensate for the enable control signal CL (or the output time or period of the enable control signal CL) based on the data rate. Accordingly, even if the output time (or period) of the data signal is varied by the data rate, the enable control signal CL may be output to match the output time (or period) of the data signal, and the deterioration of the display quality due to the mismatch between the data signal and the enable control signal CL may be prevented.

Figure 11:
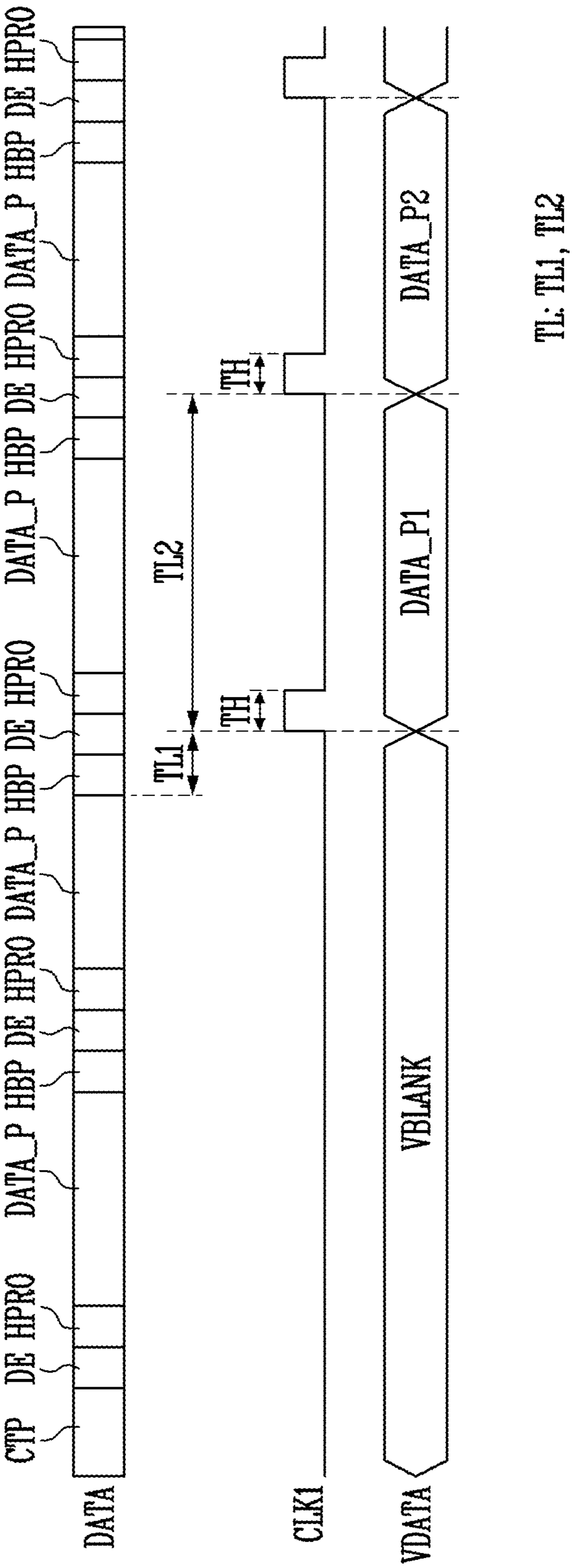
FIG. 11 illustrates an embodiment of a signal measured in the display device of FIG. 5.

FIG. 11 illustrates an embodiment of a signal measured in the display device of FIG. 5.

Referring to FIG. 5 and FIG. 11, the data driver 130 may output a data signal VDATA in response to a reference clock signal CLK1 generated from the output data DATA. The period of the reference clock signal CLK1 may vary depending on the transmission rate of the output data DATA, and the output time of the data signal VDATA may also vary.

The output data DATA (or frame protocol) may include a clock training pattern CTP, a data enable DE, a horizontal frame protocol HPRO, pixel data DATA_P, and a horizontal blank HBP depending on an interface between the timing controller 140 and the data driver 130. The clock training pattern CTP may be used to restore an embedded clock signal. The data enable DE may indicate the start of image data, the horizontal frame protocol HPRO may include information TL about the horizontal period, the pixel data DATA_P may include a grayscale (or a grayscale value) for the pixel PXij, and the horizontal blank HBP may indicate the end of image data (or data for one horizontal line).

The reference clock signal CLK1 defines an output time of the data signal VDATA, and may be generated based on the clock signal and information TL about the horizontal period included in the horizontal frame protocol HRPO (or frame protocol). Here, the clock signal may be a clock signal restored from the clock training pattern CTP, and the period of the clock signal may vary depending on the data rate. For example, the reference clock signal CLK1 may be generated by dividing the clock signal based on the information TL. For example, the period of the reference clock signal CLK1 is equal to the horizontal period, and the reference clock signal CLK1 may be or correspond to a horizontal synchronization signal.

For example, the information TL about the horizontal period may include first information TL1 (or a first value) and second information TL2 (or a second value). The first information TL1 may have a value corresponding to a time period from a specific time point to a time point at which a pulse of the reference clock signal CLK1 occurs (for example, a time point at which the reference clock signal CLK1 chages from a low level to a high level), and the second information TL2 may have a value corresponding to the interval of the horizontal period. For example, the second information TL2 may include a value representing the number of pulses of the clock signal (or the restored clock signal) included in the horizontal period. The information TL may further include information on the width TH of the pulse of the first clock signal. However, the information TL is not limited thereto. The format of the information TL or the value included therein may vary as long as it defines the output time and period of the horizontal period.

The data driver 130 may output the data signal VDATA in response to the reference clock signal CLK1. For example, the data driver 130, after the vertical blank VBLANK, may output a voltage corresponding to the first pixel data DATA_P1 for the pixel disposed on the first horizontal line at the moment when the reference clock signal CLK1 changes from a low level to a high level for the first time, and output a voltage corresponding to the second pixel data DATA_P2 for the pixel disposed on the second horizontal line at the moment when the reference clock signal CLK1 changes from a low level to a high level for the second time.

FIG. 12 illustrates a horizontal period according to a data rate.

Referring to FIG. 11 and FIG. 12, the frame protocol value is a set value for the horizontal period that is a time unit in which a data signal VDATA is output from the data driver 130 and may be included in the information TL of FIG. 11. For example, the time required to transmit 1 bit of data is 1 UI, and 1 UI corresponds to one period of the restored clock signal. The time, T, shown in FIG. 12 may be 6 UI during which 6 bits of data are transmitted. However, the present disclosure is not limited thereto.

Even if the frame protocol value is the same, the period of the restored clock signal, or its corresponding "UI" or "T", varies depending on the data rate, which means the horizontal period may vary depending on the data rate. The frame protocol value may be set or determined based on the refresh rate of the display device (or display panel). For example, the lower the refresh rate, the larger the frame protocol value.

For example, when the frame protocol value is 60 T, the horizontal period may be 164 ns for a data rate of 2.2 Gbps and 157 ns for a data rate of 2.3 Gbps. As the horizontal period according to the frame protocol value and data rate is as shown in FIG. 12, the description of each horizontal period is omitted.

Figure 13:
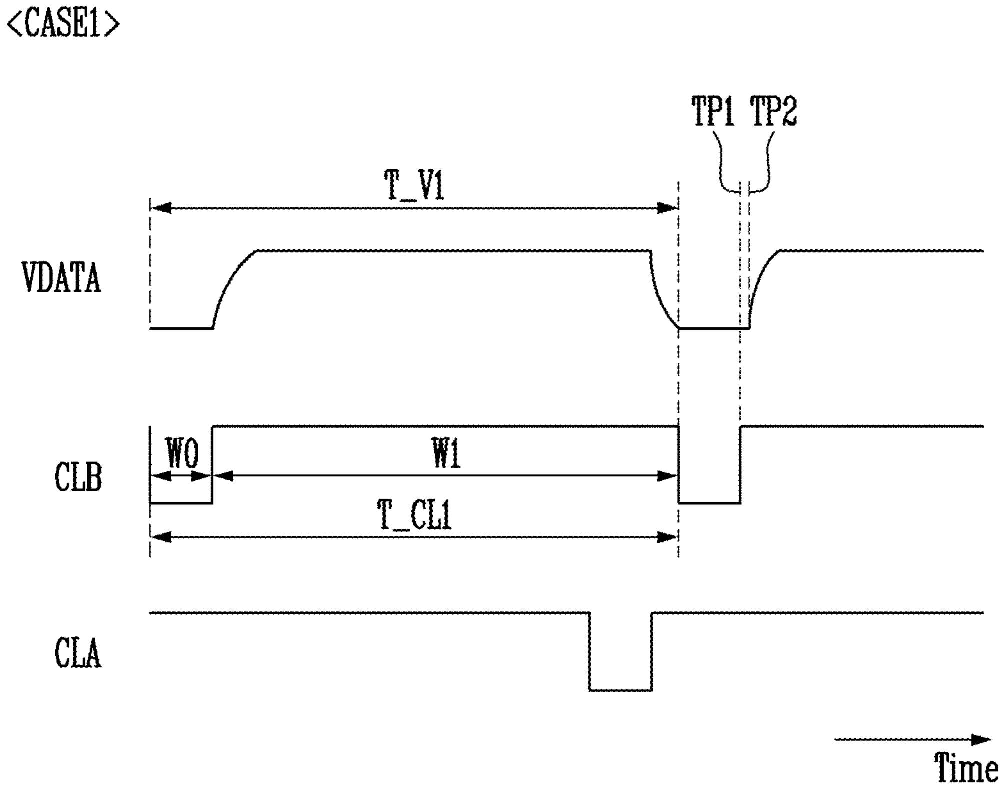
FIG. 13 and FIG. 14 illustrate waveform diagrams of an embodiment of a data signal and an enable control signal according to a data rate.
Figure 14:
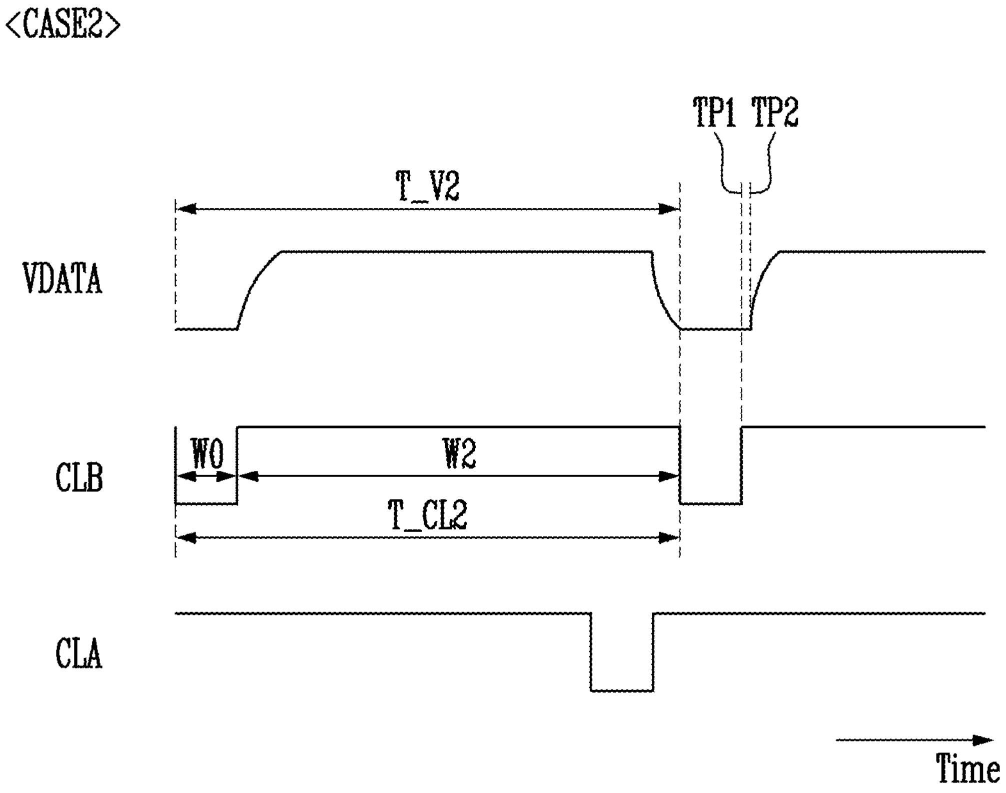

FIG. 13 and FIG. 14 illustrate waveform diagrams of an embodiment of a data signal and an enable control signal according to a data rate. FIG. 15 illustrates a waveform diagram of a comparative example of a data signal and an enable control signal according to a data rate. The timing controller 140 (or the compensator 143) of FIG. 10 is applied to the first case CASE1 of FIG. 13 and the second case CASE2 of FIG. 14. In contrast, the timing controller 140 (or the compensator 143) of FIG. 10 is not applied to the third case CASE3 of FIG. 15.

In the first case CASE1, the second case CASE2, and the third case CASE3, it is assumed that the frame protocol values (and refresh rates) are the same and the frame protocol value is, for example, 60 T. In addition, it is assumed that the data rate of the first case CASEL is 2.2 Gbps, and the data rates of the second case CASE2 and the third case CASE3 are 2.3 Gbps.

Figure 15:
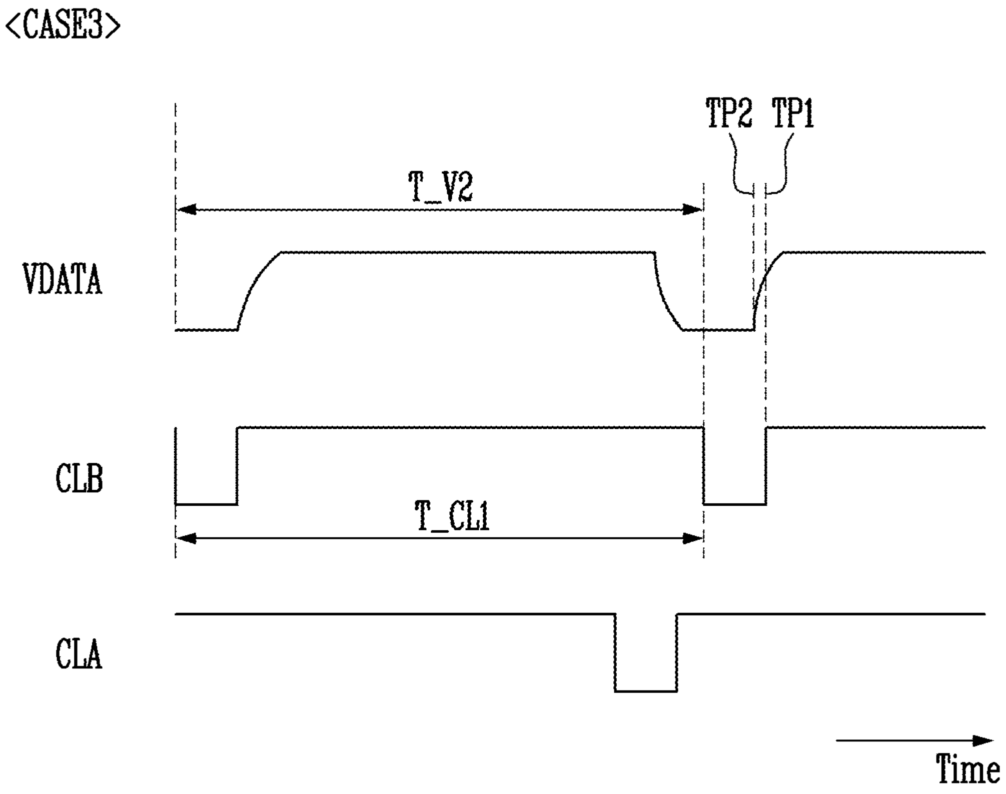
FIG. 15 illustrates a waveform diagram of a comparative example of a data signal and an enable control signal according to a data rate.

Referring to FIG. 13 to FIG. 15, the data signal VDATA may be a signal for the second pixel 2 connected to the second data line DL2 of FIG. 9. Since the first and second enable control signals CLA and CLB have been described with reference to FIG. 9, descriptions of the first and second enable control signals CLA and CLB will be omitted.

The first time T_V1 and the second time T_V2, which correspond to periods during which the data signal VDATA is output (for example, periods during which the data signal VDATA is output through the first output line OL1 of FIG. 9), may correspond to the horizontal period, and the first time T_V1 corresponding to the data rate of 2.2 Gbps may be about 164 ns, and the second time T_V2 corresponding to the data rate of 2.3 Gbps may be about 157 ns.

Referring to FIG. 13, the second enable control signal CLB in the first case CASE1 may have a period of the first control time T_CL1 (or first time). The first control time T_CL1 may be about 164 ns. For example, the control signal generator 142 of FIG. 10 may use only the internal clock signal and generate the second enable control signal CLB having the period of the first control time T_CL1, when the frame protocol value is 60 T. However, the present disclosure is not limited thereto. The first time point TP1 at which the second enable control signal CLB transitions from the low level to the high level (that is, the time point at which the second transistor M2 of FIG. 8 is turned off) may be earlier than the second time point TP2 at which the data signal VDATA transitions. That is, the second enable control signal CLB may be output from the control signal generator 142 while the data signal VDATA having a specific level is output, prior to the transition of the data signal VDATA. In this case, when the second transistor M2 of FIG. 8 is turned on, the data signal VDATA for the second pixel 2 of FIG. 9 is fully provided to or charged in the first output line OL1. Thus, the second pixel 2 may emit light with a desired luminance corresponding to the data signal VDATA.

Referring to FIG. 14, the second enable control signal CLB in the second case CASE2 may have a period of the second control time T_CL2 (or second time). The second control time T_CL2 may be about 157 ns. For example, since the data rate is changed from 2.2 Gbps to 2.3 Gbps, the compensator 143 of FIG. 10 may calculate a compensation value of −7 ns (that is, 157 ns-164 ns) according to Equation 1, and the control signal generator 142 of FIG. 10 may reduce the period of the second enable control signal CLB by the compensation value of 7 ns to generate the second enable control signal CLB. For example, the control signal generator 142 of FIG. 10 may compensate for the previously received frame protocol value by a value corresponding to −7 ns and generate the second enable control signal CLB having a period of 157 ns in response to the compensated frame protocol value. However, the present disclosure is not limited thereto.

In an embodiment, the pulse width W0 (that is, the pulse width of the low level (or the first level) of the second enable control signal CLB does not change, but the times W1 and W2 during which the second enable control signal CLB has the high level (or second level) may vary depending on the data rate. For example, the time W2 of the second case CASE2 may be reduced by 7 ns compared to the time W1 of the first case CASE1.

Since the period of the second enable control signal CLB is reduced to be equal to the horizontal period, the first time point TP1 at which the second enable control signal CLB transitions from the low level to the high level may be earlier than the second time point TP2 at which the data signal VDATA transitions. Accordingly, even in the second case CASE2, the data signal VDATA for the second pixel 2 of FIG. 9 is fully provided to or charged in the first output line OL1, and the second pixel 2 may emit light with a desired luminance corresponding to the data signal VDATA.

Referring to FIG. 15, in the third case CASE3, since the compensator 143 of FIG. 10 does not operate, the second enable control signal CLB may have a period of the first control time T_CL1, similar to the first case CASE1. Since the period of the second enable control signal CLB is greater than the horizontal period, the first time point TP1 at which the second enable control signal CLB transitions from the low level to the high level may be later than the second time point TP2 at which the data signal VDATA transitions. In this case, as the second transistor M2 of FIG. 8 is still turned on when the data signal VDATA changes, the data signal VDATA may not be fully charged to the first output line OL1. Accordingly, the second pixel 2 may emit light with a luminance different from a desired luminance.

For reference, the pulse width of the second enable control signal CLB may be set to be sufficiently wide. However, this would increase a time for supplying the data signal VDATA through the data distributor 150 (see FIG. 5), which may limit high-speed driving of the display device. In addition, the variation range (or spread ratio) of the data rate may be reduced to the extent that the first time point TP1 is the same as the second time point TP2 (for example, reducing the spread ratio to be about 1%). However, this may result in an insufficient EMI reduction effect.

In FIG. 13 and FIG. 14, only the case in which the data rate is changed from 2.2 Gbps to 2.3 Gbps is described, but the present disclosure is not limited thereto. Referring to FIG. 12, for example, when the frame protocol value is 60 T and the data rate changes from 2.3 Gbps to 2.4 Gbps (by +4.3%), the period or output time of the second enable control signal CLB may change by −7 ns or −4.4% (that is, −7 ns/157 ns). When the frame protocol value is still 60 T and the data rate changes from 2.4 Gbps to 2.5 Gbps (by +4.1%), the period or output time of the second enable control signal CLB may change by −7 ns or −4% (that is, −6 ns/150 ns).

That is, as the data rate increases, the output time of the second enable control signal CLB (or low-level pulse) may become earlier, and as the data rate decreases, the output time of the second enable control signal CLB (or low-level pulse) may become later. In addition, the output time of the second enable control signal CLB (or low level pulse) may be varied in proportion to the data rate. In other words, the period of the second enable control signal CLB may be varied inversely proportional to the data rate.

The technical idea of the present disclosure has been specifically described according to an embodiment of the present disclosure, but it should be noted that the foregoing embodiments are provided only for illustration while not limiting the present disclosure. In addition, it will be understood by those skilled in the art that the present disclosure can be modified and changed in various ways within a scope that does not depart from the technical field of the present disclosure set forth in the claims to be described below.

Therefore, the scope of the present disclosure should not be limited to the contents described in the detailed description of the specification, but should be defined by the claims.

What is claimed is:

1. A display device comprising:

a display panel including pixels connected to data lines;

a timing controller generating image data;

a data driver generating data signals based on the image data and outputting the data signals through an output terminal of the data driver; and a data distributor selectively connecting the output terminal of the data driver to the data lines of the display panel based on an enable control signal, wherein the timing controller periodically varies a data rate based on which the image data is transmitted to the data driver and periodically varies an output time of the enable control signal based on the data rate, wherein the timing controller generates the enable control signal based on an internal clock signal, and compensates for the enable control signal based on the data rate, and wherein the timing controller compensates a period of the enable control signal in proportion to a data rate difference and a frame protocol value, the frame protocol value is a set value for a horizontal period that is a time unit in which a data signal is output from the data driver, and is included in a protocol between the timing controller and the data driver, and the data rate difference is a difference between a data rate of a previous frame and a data rate of a current frame.

2. The display device of claim 1, wherein the timing controller includes a spread spectrum clock generator that generates a clock signal, the data rate corresponds to a frequency of the clock signal, and the data driver outputs the data signals at a time point set based on the clock signal.

3. The display device of claim 2, wherein the timing controller outputs the enable control signal while each data signal is output from the data driver.

4. The display device of claim 1, wherein
the output time of the enable control signal is varied in proportion to the data rate.

5. The display device of claim 4, wherein
the period of the enable control signal varies inversely proportional to the data rate.

6. The display device of claim 1, wherein
the data distributor includes a transistor connecting the output terminal of the data driver to one of the data lines,
the transistor is turned on in response to the enable control signal having a first level and turned off in response to the enable control signal having a second level, and
a pulse width of the enable control signal having the first level does not change, and a time period during which the enable control signal has the second level varies based on the data rate.

7. The display device of claim 1, wherein
the timing controller compensates for the period of the enable control signal using a lookup table, and
the lookup table includes a compensation value according to the data rate.

8. The display device of claim 1, wherein
the data rate varies stepwise within a range of about ±15% with respect to a reference data rate.

9. The display device of claim 1, wherein
the timing controller varies the data rate and the output time of the enable control signal at least once every frame.

10. The display device of claim 9, wherein
the timing controller varies the data rate and the output time of the enable control signal for each frame.

11. The display device of claim 10, wherein
the timing controller increases the data rate stepwise from a minimum data rate to a maximum data rate or decreases the data rate stepwise from the maximum data rate to the minimum data rate, over a certain period of time.

12. The display device of claim 1, wherein
a refresh rate of the display panel is not variable.

13. The display device of claim 1, wherein
the timing controller and the data driver are connected to each other through a first interface including at least one of a mobile industry processor interface (MIPI) or an Ultra path interconnect (UPI), and
the timing controller provides the enable control signal to the data distributor through a general purpose input/output (GPIO) different from the first interface.

14. An electronic device comprising:
a display panel;
a data driver;
a demultiplexer connected between the data driver and the display panel; and
a processor providing data to the data driver through a first interface and controlling an operation of the demultiplexer by providing a control signal,
wherein the processor adjusts an output time of the control signal based on a data rate based on which the data is transmitted to the data driver,
wherein the processor generates the control signal based on an internal clock signal, and compensates for the control signal based on the data rate,
wherein the processor compensates a period of the control signal in proportion to a data rate difference and a frame protocol value,
the frame protocol value is a set value for a horizontal period that is a time unit in which a data signal is output from the data driver, and is included in a protocol between the processor and the data driver, and
the data rate difference is a difference between a data rate of a previous frame and a data rate of a current frame.

15. The electronic device of claim 14, wherein
the first interface includes at least one of a mobile industry processor interface (MIPI) or an ultra path interconnect (UPI), and
the processor outputs the control signal through a general purpose input/output (GPIO).

16. The electronic device of claim 14, wherein
the output time of the control signal is varied in proportion to the data rate.

17. The electronic device of claim 16, wherein
as the data rate increases, an output time of a data signal output from the data driver to the demultiplexer becomes earlier, and
the processor adjusts the output time of the control signal to match the output time of the data signal.

* * * * *